United States Patent
Sugamata et al.

(10) Patent No.: US 10,473,998 B2
(45) Date of Patent: Nov. 12, 2019

(54) FPC-ATTACHED OPTICAL MODULATOR AND OPTICAL TRANSMISSION APPARATUS USING SAME

(71) Applicant: Sumitomo Osaka Cement Co., Ltd, Tokyo (JP)

(72) Inventors: Toru Sugamata, Tokyo (JP); Norikazu Miyazaki, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 15/851,827

(22) Filed: Dec. 22, 2017

(65) Prior Publication Data

US 2018/0231866 A1   Aug. 16, 2018

(30) Foreign Application Priority Data

Feb. 10, 2017   (JP) ................................. 2017-023080

(51) Int. Cl.
*G02F 1/225* (2006.01)
*G02F 1/21* (2006.01)

(52) U.S. Cl.
CPC .......... *G02F 1/2255* (2013.01); *G02F 1/2252* (2013.01); *G02F 2001/212* (2013.01)

(58) Field of Classification Search
CPC .......... G02F 1/21; G02F 1/225; G02F 1/2252; G02F 2001/212
See application file for complete search history.

(56) References Cited

U.S. PATENT DOCUMENTS

| 6,741,379 B2* | 5/2004 | Kaitoh | G02F 1/0305 |
| | | | 359/245 |
| 9,588,359 B2* | 3/2017 | Sugiyama | G02F 1/0121 |
| 9,651,804 B2 | 5/2017 | Sugiyama et al. | |
| 10,061,179 B2* | 8/2018 | Miyazaki | G02F 1/2255 |
| 10,175,553 B2* | 1/2019 | Ishii | G02B 6/126 |
| 2003/0151792 A1* | 8/2003 | Kaitoh | G02F 1/0305 |
| | | | 359/279 |
| 2015/0253593 A1* | 9/2015 | Sugiyama | G02F 1/0121 |
| | | | 385/40 |
| 2016/0161771 A1* | 6/2016 | Sugiyama | G02B 6/4201 |
| | | | 385/3 |
| 2017/0012700 A1* | 1/2017 | Hosokawa | G02F 1/225 |
| 2017/0212402 A1* | 7/2017 | Ishii | H01R 12/592 |
| 2018/0024411 A1* | 1/2018 | Miyazaki | G02F 1/0121 |
| | | | 385/3 |
| 2018/0059503 A1* | 3/2018 | Miyazaki | G02F 1/2255 |
| 2018/0088361 A1* | 3/2018 | Sugamata | G02F 1/0316 |
| 2018/0180908 A1* | 6/2018 | Katou | G02F 1/0305 |
| 2018/0217467 A1* | 8/2018 | Miyazaki | G02F 1/225 |
| 2018/0231866 A1* | 8/2018 | Sugamata | G02F 1/2255 |

FOREIGN PATENT DOCUMENTS

JP    2012-156947 A    8/2012
JP    2016109941 A    6/2016

* cited by examiner

*Primary Examiner* — Andrew Jordan
(74) *Attorney, Agent, or Firm* — IpHorgan Ltd.

(57) ABSTRACT

An optical modulator includes: an optical modulation element which includes signal electrodes; lead pins; and a relay substrate in which a conductor pattern which electrically connects each of the lead pins and each of the signal electrodes to each other are formed, and the optical modulator is configured such that the amount of radiation of a high frequency at a connection portion between the conductor pattern and the signal electrode is increased compared to a portion other than the connection portion.

16 Claims, 12 Drawing Sheets

DETAIL OF PORTION A

IIB-IIB LINE SECTIONAL VIEW IN DIRECTION OF ARROW

DETAIL OF PORTION F

XIVB-XIVB LINE SECTIONAL VIEW IN DIRECTION OF ARROW

FPC-ATTACHED OPTICAL MODULATOR AND OPTICAL TRANSMISSION APPARATUS USING SAME

CROSS-REFERENCE TO RELATED APPLICATIONS

This application claims the benefit of Japanese Patent Application No. 2017-023080 filed Feb. 10, 2017, the disclosure of which is herein incorporated by reference in its entirety.

BACKGROUND OF THE INVENTION

Field of the Invention

The present invention relates to an optical modulator and in particular, to an optical modulator which is provided with a relay substrate which performs a relay between a plurality of conductors (for example, lead pins) for inputting a high-frequency signal, which are provided in a housing, and electrodes of an optical modulation element, and an optical transmission apparatus using the optical modulator.

Description of Related Art

In high-frequency and high-capacity optical fiber communication systems, optical modulators having a waveguide-type optical modulation element incorporated therein are frequently used. Among them, an optical modulation element in which $LiNbO_3$ (hereinafter, also referred to as LN) having an electro-optic effect is used for a substrate can realize an optical modulation characteristic with a small light loss and a wide band, and therefore, it is widely used for a high-frequency and high-capacity optical fiber communication system.

The optical modulation element using the LN substrate is provided with a Mach-Zehnder optical waveguide, a RF electrode for applying a high-frequency signal, which is a modulation signal, to the optical waveguide, and a bias electrode for performing a variety of adjustments in order to favorably maintain a modulation characteristic in the waveguide. Then, these electrodes provided in the optical modulation element are connected to a circuit board, on which an electronic circuit for causing the optical modulator to perform a modulation operation is mounted, via lead pins or connectors provided in a housing of the optical modulator, which houses the optical modulation element.

As a modulation form in the optical fiber communication system, in response to the recent trend toward an increase in transmission capacity, multilevel modulation such as Quadrature Phase Shift Keying (QPSK) or Dual Polarization-Quadrature Phase Shift Keying (DP-QPSK), or a transmission format with polarization multiplexing incorporated into the multilevel modulation is the main stream and is used in a core optical transmission network. However, it is also being introduced into a metro network.

An optical modulator which performs QPSK modulation (a QPSK optical modulator), or an optical modulator which performs DP-QPSK modulation (a DP-QPSK optical modulators) is provided with a plurality of Mach-Zehnder optical waveguides having a nested structure which is called a so-called nested type, and is also provided with a plurality of high-frequency signal electrodes and a plurality of bias electrodes (refer to, for example, Japanese Laid-open Patent Publication No. 2016-109941). Therefore, the size of a housing of the optical modulator tends to be larger. However, in recent years, conversely, a demand for the downsizing of the modulator has increased.

As a measure responding to this downsizing demand, in the related art, an optical modulator which enables electrical connection with an external circuit board by replacing a push-on type coaxial connector provided in a housing of an optical modulator as an interface of the RF electrode with lead pins similar to an interface for a bias electrode and a flexible printed circuit (FPC) which is electrically connected to these lead pins has been proposed (refer to, for example, Japanese Laid-open Patent Publication No. 2016-109941).

For example, in the DP-QPSK optical modulator, an optical modulation element which is configured of four Mach-Zehnder optical waveguides each having a RF electrode is used. In this case, if four push-on type coaxial connectors are provided in a housing of an optical modulator, an increase in the size of the housing is inevitable. However, if lead pins and an FPC are used instead of the coaxial connector, downsizing becomes possible.

Further, the lead pins of the housing of the optical modulator and a circuit board on which an electronic circuit (a drive circuit) for causing the optical modulator to perform a modulation operation is mounted are connected to each other through the FPC, and therefore, it is not necessary to perform the excess length treatment of a coaxial cable which has been used in the related art, and it is possible to reduce the mounting space of the optical modulator in an optical transmission apparatus.

In such an optical modulator having the lead pins for inputting a high-frequency electrical signal provided in the housing, in general, the lead pins and the electrodes of the optical modulation element housed in the housing are connected to each other through a relay substrate disposed in the housing (refer to, for example, Japanese Laid-open Patent Publication No. 2016-109941).

FIG. 13A, FIG. 13B, and FIG. 13C are diagrams showing an example of the configuration of the optical modulator of the related art as described above. Here, FIG. 13A is a plan view showing the configuration of an optical modulator 1300 of the related art mounted on a circuit board 1330, FIG. 13B is a side view of the optical modulator 1300 of the related art, and FIG. 13C is a bottom view of the optical modulator 1300 of the related art. The optical modulator 1300 is provided with an optical modulation element 1302, a housing 1304 which houses the optical modulation element 1302, a flexible printed circuit (FPC) 1306, an optical fiber 1308 to input light to the optical modulation element 1302, and an optical fiber 1310 which leads light which is output from the optical modulation element 1302 to the outside of the housing 1304.

The optical modulation element 1302 is a DP-QPSK optical modulator which is provided with four Mach-Zehnder optical waveguides provided on, for example, an LN substrate, and four high-frequency electrodes (RF electrodes) 1312a, 1312b, 1312c, and 1312d which are respectively provided on the Mach-Zehnder optical waveguides and modulate light waves propagating through the optical waveguides.

The housing 1304 is configured of a case 1314a to which the optical modulation element 1302 is fixed, and a cover 1314b. In order to facilitate the understanding of the configuration of the inside of the housing 1304, in FIG. 13A, only a part of the cover 1314b is shown on the left side in the drawing.

The case 1304a is provided with four lead pins 1316a, 1316b, 1316c, and 1316d. The lead pins 1316a, 1316b, 1316c, and 1316d are sealed with glass sealing portions 1400a, 1400b, 1400c, and 1400d (described later), extend from the bottom surface (the surface shown in FIG. 13C) of the housing 1304 to the outside, and are connected to through-holes formed on the FPC 1306 with solder and the like.

One end of each of the lead pins 1316a, 1316b, 1316c, and 1316d is electrically connected to one end of each of the RF electrodes (i.e., signal electrode) 1312a, 1312b, 1312c, and 1312d of the optical modulation element 1302 through a relay substrate 1318.

The other end of each of the RF electrodes 1312a, 1312b, 1312c, and 1312d is electrically terminated by a terminator 1320.

FIG. 14A is a partial detail view of a portion F of the optical modulator 1300 shown in FIG. 13A, and FIG. 14B is a cross-sectional view of the optical modulator 1300 taken along line XIVB-XIVB in FIG. 13A and viewed in a direction of an arrow. The lead pins 1316a, 1316b, 1316c, and 1316d extend from the inside of the housing 1304 to the outside of the housing 1304 through the glass sealing portions 1400a, 1400b, 1400c, and 1400d provided in the case 1314a, protrude from the lower surface (the surface shown in FIG. 13C) of the housing 1304, and are solder-fixed to the through-holes of the FPC 1306.

The lead pins 1316a, 1316b, 1316c, and 1316d are disposed in the vicinity of a side (a lead pin-side edge 1410) on the lower side of the relay substrate 1318 in FIG. 14A (the left side of the relay substrate 1318 in FIG. 14B), and are electrically connected to conductor patterns 1402a, 1402b, 1402c, and 1402d provided on the relay substrate 1318 by solders 1408a, 1408b, 1408c, and 1408d, respectively.

Further, the conductor patterns 1402a, 1402b, 1402c, and 1402d are electrically connected to the RF electrodes 1312a, 1312b, 1312c, and 1312d of a lower end portion of the optical modulation element 1302 (the left end of the optical modulation element 1302 in FIG. 14B), disposed in the vicinity of a side (a modulator-side edge 1412) on the upper side of the relay substrate 1318 in FIG. 14A (the right side of the relay substrate 1318 in FIG. 14B), by, for example, gold wires 1406a, 1406b, 1406c, and 1406d, respectively.

The conductor patterns 1402a, 1402b, 1402c, and 1402d are usually configured as linear patterns parallel to each other in order to minimize a signal propagation loss and a skew (a propagation delay time difference) by minimizing the propagation distance of the high-frequency signal from the respective lead pins 1316a, 1316b, 1316c, and 1316d to the respective RF electrodes 1312a, 1312b, 1312c, and 1312d corresponding to the respective lead pins 1316a, 1316b, 1316c, and 1316d. Therefore, the optical modulator 1300 is configured such that the interval between the respective lead pins 1316a, 1316b, 1316c, and 1316d is the same as the interval between the respective RF electrodes 1312a, 1312b, 1312c, and 1312d.

Further, the conductor patterns 1402a, 1402b, 1402c, and 1402d are, for example, grounded coplanar lines, and ground patterns 1418a, 1418b, 1418c, 1418d, and 1418e are provided so as to interpose each of the conductor patterns 1402a, 1402b, 1402c, and 1402d therebetween on the front surface (the surface on which the conductor pattern 1402a or the like shown in FIG. 14A is provided) of the relay substrate 1318. Further, each of the ground patterns 1418a, 1418b, 1418c, 1418d, and 1418e is electrically connected to a ground pattern (not shown) provided on the back surface of the relay substrate 1318 through a plurality of via holes 1420. In FIG. 14A, for ease of viewing, only the via holes provided in one ground pattern 1418a are denoted by reference numerals. However, all the circular portions shown in the regions of the other ground patterns 1418b, 1418c, 1418d, and 1418e are the same via holes.

The ground patterns 1418a, 1418b, 1418c, 1418d, and 1418e are electrically connected to ground electrodes (not shown) on the optical modulation element 1302 by gold wires 1412a, 1412b, 1412c, 1412d, and 1412e, respectively.

Here, in general, an electrical signal which is input from the lead pin 1316a or the like sealed by the glass sealing portion 1400a or the like is a high-frequency signal (a microwave signal) of several tens of GHz. For this reason, the designed impedance (a designed value of characteristic impedance) of the lead pin 1316a or the like, the designed impedance of the conductor pattern 1402a or the like which is formed on the relay substrate 1318, and the designed impedance of the RF electrode 1312a or the like of the optical modulation element 1302 are set to, for example, the same value (for example, 50 Ω), whereby impedance matching is achieved. In this way, reflection or radiation of the high-frequency signal in a high-frequency transmission channel from the lead pin 1316a or the like to the RF electrode 1312a or the like of the optical modulation element 1302 through the conductor pattern 1402a or the like on the relay substrate 1318 is suppressed.

With the above configuration, in the optical modulator 1300, the high-frequency electrical signals input from conductor patterns 1332a, 1332b, 1332c, and 1332d (FIG. 13A) formed on the circuit board 1330 to the lead pins 1316a, 1316b, 1316c, and 1316d via the FPC 1306 are input to the RF electrodes 1312a, 1312b, 1312c, and 1312d of the optical modulation element 1302 via the relay substrate 1318.

However, even in the optical modulator 1300 in which impedance matching is achieved as described above, there is a case where a problem such as a noise signal component being superimposed on each RF electrode 1312a or the like of the optical modulation element 1302, so that a high-frequency characteristic such as an eye pattern extinction ratio or a jitter of the optical modulator 1300 deteriorates and the transmission characteristics of the optical transmission apparatus deteriorate, arises.

As a result of intensive studies on this problem, the inventors of the present invention have found that one cause of this problems is a phenomenon in which a high frequency propagating through one conductor pattern (1402a or the like) resonates by repeating reflection at both end portions of the relay substrate and the resonated high frequency resonates with another conductor pattern (1402b or the like), whereby a part of the power of the high frequency transits to another conductor pattern (hereinafter referred to as a resonance transition).

That is, a connection portion with the lead pin 1316a or the like at an end portion on one side of the relay substrate 1318 is a portion in which the propagation direction of the high frequency propagating through the lead pin 1316a or the like is curved by 90 degrees toward the conductor pattern 1402a or the like on the relay substrate 1318 (FIG. 14B), and even if the designed impedance is matched between the lead pin 1316a or the like and the conductor pattern 1402a or the like, it may be impossible to sufficiently suppress the reflection of the high frequency at the end portion on one side.

Further, also at a connection portion with the RF electrode 1312a or the like of the optical modulation element 1302 in an end portion on the other side of the relay substrate 1318, patterns (the conductor pattern 1402a or the like and the RF electrode 1312a or the like) respectively formed on two substrates having different dielectric constants, such as the relay substrate 1318 (for example, ceramic) and the substrate of the optical modulation element 1302 (for example, lithium niobate), are connected to each other through, for example, a wire with a space interposed therebetween. For this reason, even if the designed impedances of these patterns are set to be the same as each other, it is difficult to completely suppress reflection of the high frequency at the end portion on the other side.

As a result, due to the reflection of the high frequency occurring at both end portions of the relay substrate 1318, the high frequency propagating through the conductor patterns 1402a or the like has the maximum power at a specific resonance frequency which is determined by the electrical length of the conductor pattern 1402a or the like which is a distributed constant line. Then, the resonance frequency component having the maximum power returns to the electrical signal source side as a reflected wave, thereby making the operation of an external circuit (for example, a drive circuit which outputs a high-frequency electrical signal for each RF electrode 1312a or the like) unstable, or reaches the RF electrode 1312a or the like as a traveling wave (or a transmitted wave) and becomes noise.

In particular, in the relay substrate 1318 of the optical modulator 1300 of the related art, as described above, the conductor patterns 1402a, 1402b, 1402c, and 1402d are configured as linear patterns parallel to each other in order to minimize a signal propagation loss and a skew, and therefore, the resonance frequencies in the respective conductor patterns become substantially the same. As a result, if resonance occurs in one conductor pattern, the high-frequency component of the resonance frequency having the maximum power transits to another conductor pattern having substantially the same resonance frequency, and thus the resonance transition occurs.

Then, in a case in which such a resonance transition occurs, a resonance frequency component having a high power generated in one conductor pattern affects not only the operation of a corresponding RF electrode but also the operation of the other RF electrode through the resonance transition. For this reason, in particular, in the case of a device in which four RF electrodes perform an optical modulation operation in cooperation with each other, like the DP-QPSK modulator, the resonance frequency component having a high powder generated in the one conductor pattern appears as a synergetic effect of four noises generated in each of the four RF electrodes and deteriorates a high-frequency characteristic such as an eye pattern extinction ratio or a jitter of modulated light.

Further, such a resonance transition easily occurs when a plurality of high-frequency signals propagate in parallel within a narrow region, and the larger the power of the input high-frequency signal (for example, the amplitude of the high-frequency signal), the more easily the resonance transition occurs. For example, in the DP-QPSK modulator to which four high-frequency signals are input, a high-frequency signal having an amplitude of twice a half-wavelength voltage is input to each electrode, and therefore, in a configuration in which the interval between the lead pins is narrowed using an FPC, as described above, the input of a high-frequency signal having a high power concentrates on a narrow region, and thus an environment in which the resonance transition more easily occurs can be made.

SUMMARY OF THE INVENTION

From the above background, in an optical modulator which is provided with a relay substrate which performs a relay between lead pins for inputting a high-frequency signal and electrodes of an optical modulation element, it is desired to reduce the influence of the resonance transition between a plurality of conductor patterns formed on the relay substrate and prevent deterioration of an optical modulation characteristic (for example, a high-frequency characteristic such as an eye pattern extinction ratio or a jitter).

An aspect of the present invention is an optical modulator including: an optical modulation element which includes a plurality of signal electrodes; a plurality of lead pins for inputting a high-frequency signal; and a relay substrate in which conductor patterns which electrically connect the lead pins and the signal electrodes are formed, in which the optical modulator is configured such that the amount of high frequency radiation from the vicinity of a connection portion between the conductor pattern and the signal electrode is larger compared to that from a portion other than the connection portion.

According to another aspect of the present invention, with respect to at least one of the conductor patterns, a configuration in the connection portion of a ground pattern which is provided on a front surface of the relay substrate is different from a configuration of the other portion such that the amount of high frequency radiation from the vicinity of the connection portion between the conductor pattern and the signal electrode is larger compared to that from the portion other than the connection portion.

According to another aspect of the present invention, the conductor pattern of the relay substrate configures a coplanar line together with a ground pattern provided on the relay substrate and a structure connected to a ground potential which comes into contact with a back surface of the relay substrate, and with respect to at least of the one conductor patterns, a portion of the back surface of the relay substrate corresponding to the connection portion is different from a portion other than said portion of the back surface in a condition of electrical contact with the structure at the back surface such that the amount of high frequency radiation from the vicinity of the connection portion between the conductor pattern and the signal electrode is larger compared to that from the portion other than the connection portion.

According to another aspect of the present invention, the ground pattern provided on the front surface of the relay substrate is connected to a ground pattern provided on a back surface of the relay substrate through a plurality of via holes, and a diameter of each of the via holes provided within a predetermined distance range from an edge of the relay substrate closest to the connection portion, is smaller than a diameter of each of the via holes provided outside the predetermined distance range.

According to another aspect of the present invention, the ground pattern provided on the front surface of the relay substrate is connected to a ground pattern provided on a back surface of the relay substrate through a plurality of via holes, and the via hole is not provided within a predetermined distance range from an edge of the relay substrate closest to the connection portion.

According to another aspect of the present invention, the ground pattern provided on a front surface of the relay substrate is configured so as to extend in a predetermined width along a length direction of the conductor pattern adjacent to said ground pattern within a predetermined distance range from an edge of the relay substrate closest to the connection portion.

According to another aspect of the present invention, the ground pattern provided on the front surface of the relay substrate does not extend within a predetermined distance range from an edge of the relay substrate closest to the connection portion.

According to another aspect of the present invention, a wire at a position closest to the adjacent conductor pattern thereto, among wires which connect the ground pattern provided on the front surface of the relay substrate and a ground electrode provided on the optical modulation element, is connected to said ground pattern at a position away by a predetermined distance from an edge on the side of the adjacent conductor pattern among edges of said ground pattern, and the predetermined distance is equal to or longer than a distance between the edge on the side of the adjacent conductor pattern and an edge of said conductor pattern.

According to another aspect of the present invention, a portion of the back surface outside a predetermined distance range from an edge of the relay substrate closest to the connection portion is electrically connected to the structure through a conductive material, and a portion of the back surface within the predetermined distance range is not connected to the structure through a conductive material.

According to another aspect of the present invention, the relay substrate is configured such that a thickness of a portion within the predetermined distance range is thinner than a thickness of a portion outside the predetermined distance range.

According to another aspect of the present invention, a metal film is provided at a portion outside the predetermined distance range on the back surface of the relay substrate, and the metal film is not provided at a portion within the predetermined distance range.

According to another aspect of the present invention, the relay substrate is mounted on the structure such that a portion within the predetermined distance range protrudes from an edge of the structure.

Another aspect of the present invention is an optical modulator including: an optical modulation element which includes a plurality of signal electrodes; a plurality of lead pins for inputting a high-frequency signal; and a relay substrate in which conductor patterns which electrically connect the lead pins and the signal electrodes are formed on a front surface thereof, in which the front surface of the relay substrate and a surface of the optical modulation element on which the signal electrodes are formed form a step at a portion where the conductor pattern and the signal electrode are connected to each other.

Still another aspect of the present invention is an optical transmission apparatus including: the optical modulator according to any one of the aspects described above; and an electronic circuit which outputs an electric signal for causing the optical modulator to perform a modulation operation.

DETAILED DESCRIPTION OF THE INVENTION

Hereinafter, embodiments of the present invention will be described with reference to the drawings.

<First Embodiment>

Figure 1A:
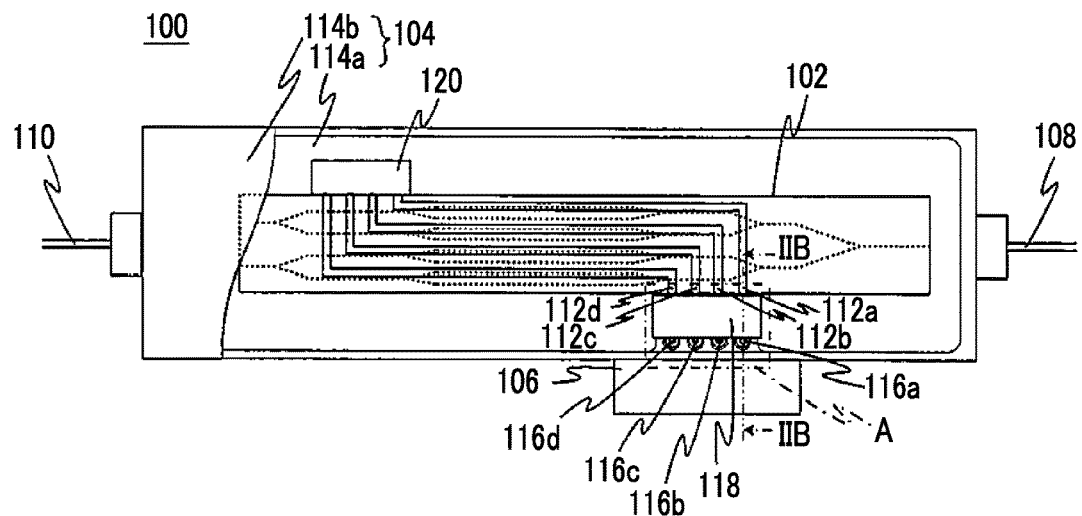
FIG. 1A is a plan view of an optical modulator according to a first embodiment of the present invention, showing a configuration of the optical modulator.
Figure 1B:
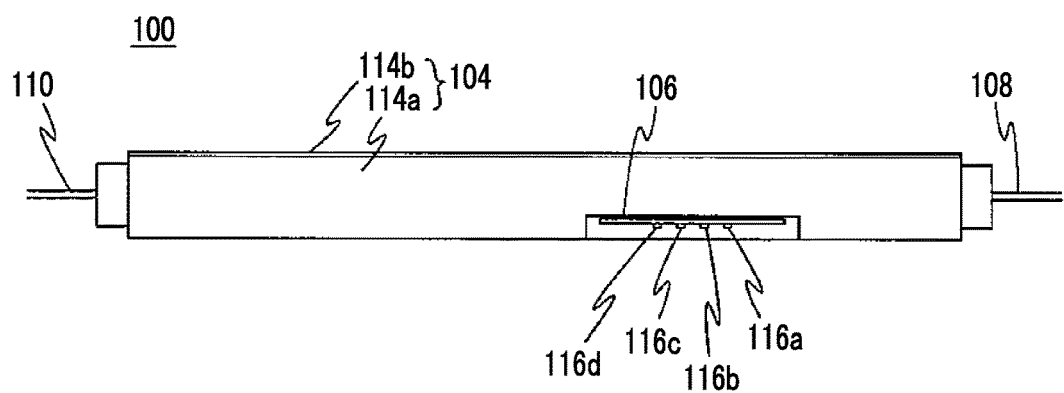
FIG. 1B is a side view of the optical modulator according to the first embodiment of the present invention.
Figure 1C:
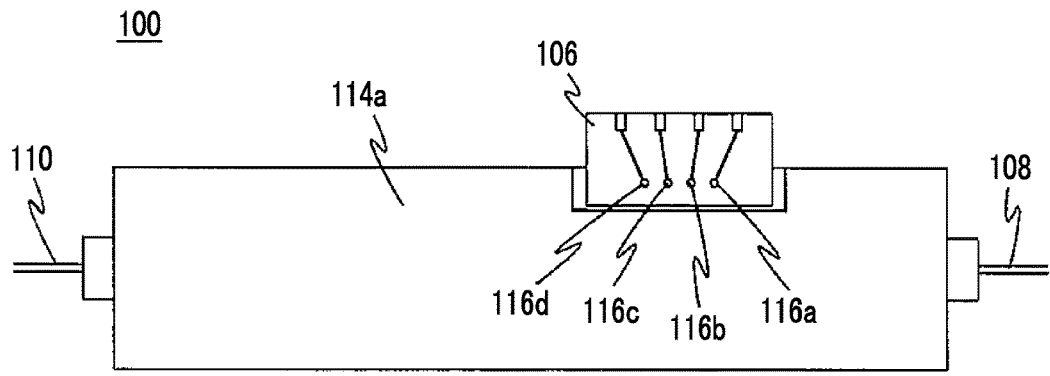
FIG. 1C is a bottom view of the optical modulator according to the first embodiment of the present invention.

First, a first embodiment of the present invention will be described. FIG. 1A, FIG. 1B, and FIG. 1C are diagrams showing the configuration of an optical modulator according to the first embodiment of the present invention. Here, FIG. 1A, FIG. 1B, and FIG. 1C are respectively a plan view, a side view, and a bottom view of an optical modulator 100 according to the first embodiment.

The optical modulator 100 is provided with an optical modulation element 102, a housing 104 which houses the optical modulation element 102, a flexible printed circuit (FPC) 106, an optical fiber 108 to input light to the optical modulation element 102, and an optical fiber 110 which leads the light which is output from the optical modulation element 102 to the outside of the housing 104.

The optical modulation element 102 is a DP-QPSK optical modulator which is provided with four Mach-Zehnder optical waveguides provided on, for example, an LN substrate and four high-frequency electrodes (RF electrodes) 112a, 112b, 112c, and 112d as signal electrode which are respectively provided on the Mach-Zehnder optical waveguides and modulate light waves propagating through the optical waveguides. Two lights which are output from the optical modulation element 102 are polarization-combined by, for example, a lens optical system (not shown) and are led to the outside of the housing 104 through the optical fiber 110.

The housing 104 is configured of a case 114a to which the optical modulation element 102 is fixed, and a cover 114b. In order to facilitate the understanding of the configuration in the housing 104, in FIG. 1A, only a part of the cover 114b is shown on the left side in the drawing. However, in fact, the cover 114b is disposed so as to cover the whole of the box-shaped case 114a and hermetically seals the inside of the housing 104.

The case 114a is provided with four lead pins 116a, 116b, 116c, and 116d which are conductors for high-frequency signal input. The lead pins 116a, 116b, 116c, and 116d extend from the bottom surface (the surface shown in FIG. 1C) of the housing 104 to the outside and are connected to through-holes formed on the FPC 106 by solder or the like. Further, the case 114a is configured of a conductive material (for example, metal such as stainless steel, or a material coated with a thin metal film such as gold) and is connected to a ground line through the FPC 106 or by bringing the case 104a into contact with an external structure when mounting the optical modulator 100 on a transmission apparatus or the like.

Each of the lead pins 116a, 116b, 116c, and 116d is electrically connected to one end of each of the RF electrodes 112a, 112b, 112c, and 112d of the optical modulation element 102 through a relay substrate 118. The configuration of the relay substrate 118 will be described later.

Each of the RF electrodes 112a, 112b, 112c, and 112d is designed such that characteristic impedance reaches a predetermined value (in this embodiment, for example, 50 Ω) in an operation frequency range, and the other ends of the RF electrodes 112a, 112b, 112c, and 112d are terminated by a terminator 120 having impedance (for example, 50 Ω) of the predetermined value. In the following, the "characteristic impedance" refers to characteristic impedance in the operation frequency range of the optical modulation element 102 unless otherwise specified.

Figure 2A:
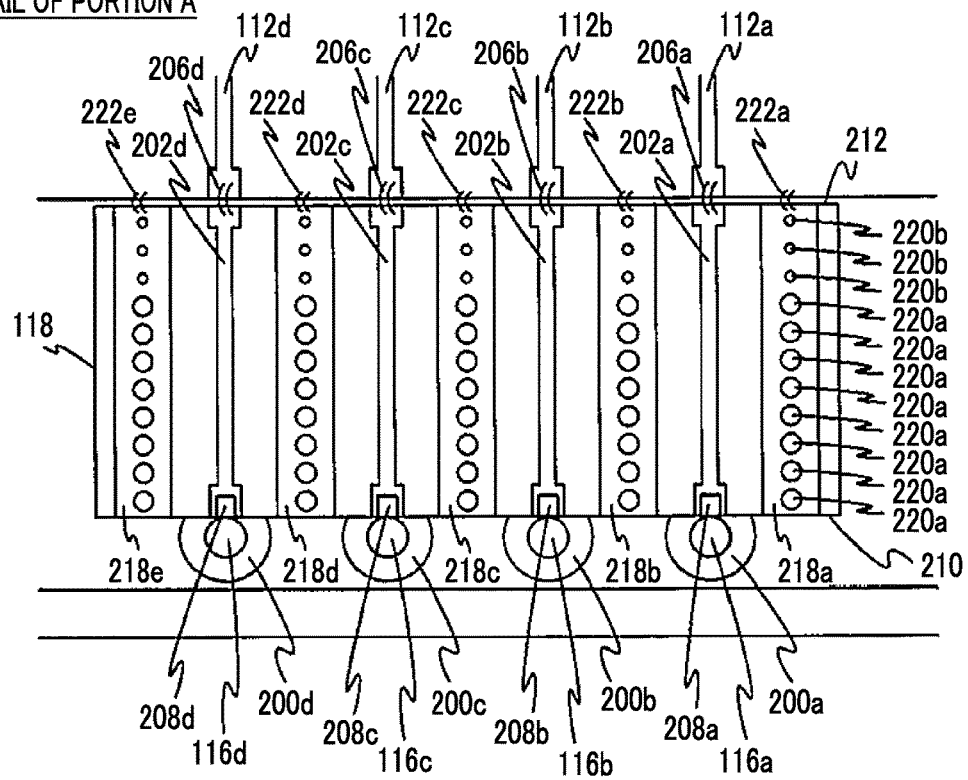
FIG. 2A is a partial detail view of a portion A of the optical modulator shown in FIG. 1A.
Figure 2B:
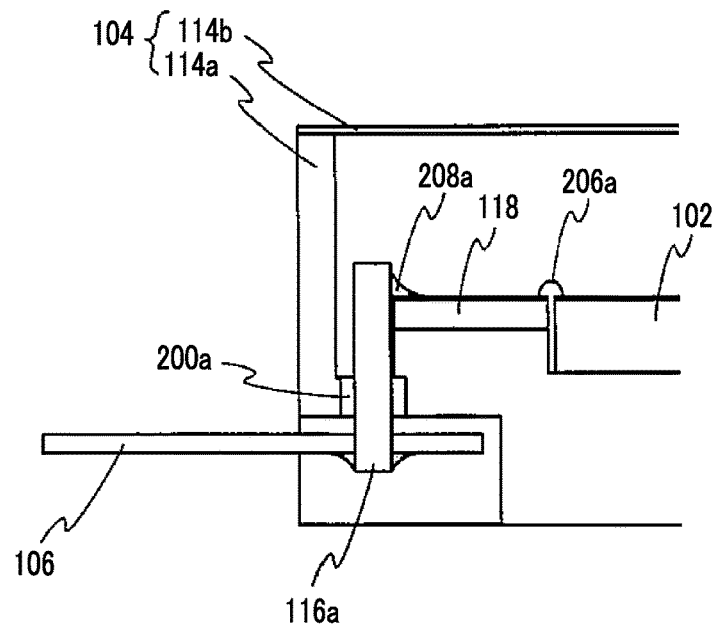
FIG. 2B is a cross-sectional view of the optical modulator taken along line IIB-IIB in FIG. 1A and viewed in a direction of an arrow.

FIG. 2A is a partial detail view of a portion A of the optical modulator 100 shown in FIG. 1A, and FIG. 2B is a cross-sectional view of the optical modulator 100 taken along line IIB-IIB in FIG. 1A and viewed in a direction of an arrow. Four conductor patterns 202a, 202b, 202c, and 202d are provided on the relay substrate 118. The conductor patterns 202a, 202b, 202c, and 202d are, for example, linear patterns and are respectively electrically connected to the RF electrodes 112a, 112b, 112c, and 112d of a lower end portion in the drawing of the optical modulation element 102 (the left end of the optical modulation element 102 in FIG. 2B), disposed in the vicinity of a side (a modulator-side edge 212) on the upper side of the relay substrate 118 in FIG. 2A (the right side of the relay substrate 118 in FIG. 2B), by conductor wires (for example, gold wires) 206a, 206b, 206c, and 206d, for example.

The conductor patterns 202a, 202b, 202c, and 202d provided on the relay substrate 118 are, for example, grounded coplanar lines and are designed so as to have the same characteristic impedance (for example, 50 Ω) as the RF electrodes 112a, 112b, 112c, and 112d of the optical modulation element 102. That is, ground patterns 218a, 218b, 218c, 218d, and 218e are provided on the front surface (the surface on which the conductor pattern 202a or the like shown in FIG. 2A is provided) of the relay substrate 118 so as to interpose the respective conductor patterns 202a, 202b, 202c, and 202d therebetween, and the ground patterns 218a, 218b, 218c, 218d, and 218e are respectively electrically connected to ground patterns (not shown) provided on the back surface of the relay substrate 118 through via holes 220a and 220b provided in the respective ground patterns. In FIG. 2A, for ease of viewing, the via holes are denoted by reference numerals only in one ground pattern 218a. However, the disposition and configurations of the via holes (circular portions shown in the regions of the respective ground patterns) in the other ground patterns 218b, 218c, 218d, and 218e are the same as the disposition and configurations of the via holes in the ground pattern 218a.

Further, the ground patterns 218a, 218b, 218c, 218d, and 218e are electrically connected to ground electrodes (not shown) on the optical modulation element 102 by conductor wires (for example, gold wires) 222a, 222b, 222c, 222d, and 222e, respectively.

Hereinafter, the "via hole" refers to a via hole for electrically connecting the ground pattern provided on the back surface of the relay substrate and the ground pattern provided on the front surface of the relay substrate, unless otherwise specified.

The lead pins 116a, 116b, 116c, and 116d are designed so as to have the same characteristic impedance (for example, 50 Ω) as the RF electrodes 112a, 112b, 112c, and 112d of the optical modulation element 102, extend from the inside of the housing 104 to the outside of the housing 104 through glass sealing portions 200a, 200b, 200c, and 200d provided in the case 114a, protrude from the lower surface (the surface shown in FIG. 1C) of the housing 104, and are solder-fixed to the through holes of the FPC 106.

Further, the lead pins 116a, 116b, 116c, and 116d are disposed in the vicinity of a side (a lead pin-side edge 210) of the lower side of the relay substrate 118 in FIG. 2A (the left side of the relay substrate 118 in FIG. 2B) and are electrically connected to the conductor patterns 202a, 202b, 202c, and 202d provided on the relay substrate 118 by solders 208a, 208b, 208c, and 208d, respectively.

With the above configuration, a high-frequency signal input from, for example, a drive device (for example, a printed wiring board (PWB) on which a drive circuit is configured) provided outside the housing 104 to the lead pins 116a, 116b, 116c, and 116d via the FPC 106 is input to the RF electrodes 112a, 112b, 112c, and 112d of the optical modulation element 102 through the conductor patterns 202a, 202b, 202c, and 202d on the relay substrate 118, and thus an optical modulation operation is performed in the optical modulation element 102.

In particular, in this embodiment, the diameter of each of the via holes 220b which are provided in a predetermined distance range (for example, a distance range of about 100 μm to 2 mm) from the modulator-side edge 212 of the relay substrate 118 is smaller than the diameter of each of the via holes 220a which are provided outside the distance range. As described above, the disposition and configurations of the via holes in the ground patterns 218b, 218c, 218d, and 218e are the same as the disposition and configurations of the via holes 220a and 220b in the ground pattern 218a.

In this way, in the optical modulator 100 of this embodiment, as a result of the fact that the cross-sectional area of the via hole 220b in a portion in the vicinity of the modulator-side edge 212, which connects the ground pattern 218a or the like on the front surface of the relay substrate 118 and the ground pattern (not shown) on the back surface is reduced compared to the cross-sectional area of the via hole 220a provided in a portion other than the portion in the vicinity of the modulator-side edge 212 (that is, as a result of the fact that the resistance of a conductor connecting the ground pattern of the back surface and the ground pattern of the front surface in the portion, in the portion in the vicinity of the modulator-side edge 212, is increased and the performance (ground performance) of stably holding the potentials of the ground patterns on both sides is lowered), the degree of confinement of the high-frequency signal in the vicinity of the modulator-side edge 212 in the conductor patterns 202a, 202b, 202c, and 202d interposed between the respective ground patterns 218a, 218b, 218c, 218d, and 218e becomes weak compared to other portions. For this reason, a part of the high-frequency signal propagating through each of the conductor patterns 202a, 202b, 202c, and 202d is radiated to the slight inside of the relay substrate 118 or the slight inside of the optical modulation element 102, or in the air in the vicinity of the modulator-side edge 212. That is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between each of the conductor patterns 202a, 202b, 202c, and 202d and each of the RF electrodes 112a, 112b, 112c, and 112d or a portion in the vicinity of the connection portion is increased compared to the other portion.

Then, for the radiation of the high-frequency signal, the amount of the high-frequency signals (that is, the amount of reflection of the high frequencies) which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, becomes small compared to the configuration of the related art in which all the via holes 1420 have the same shape and are connected to the ground patterns on the back surface of the relay substrate 1318.

As a result, a resonance phenomenon in each of the conductor patterns 202a, 202b, 202c, and 202d is reduced and a resonance transition of high-frequency power between these conductor patterns is suppressed. Therefore, the optical modulation characteristic of the optical modulator 100 are maintained satisfactorily.

In this embodiment, three small-diameter via holes 220b are provided within a predetermined distance range from the modulator-side edge 212, and the mutual distances between the via holes 220a and 220b are set to be the same (FIG. 2A). However, there is no limitation thereto, and for example, the number of via holes 220b which are provided within the predetermined distance range may be changed to the number (not including 0) other than three, or the distances between the via holes 220a and between the via holes 220b may be irregularly changed.

Further, the diameter of each of the plurality of via holes which are provided within the predetermined distance range can be made to be smaller than the diameter of each of the via holes 220a which are provided outside the range, and the diameters of the via holes can be made to be reduced, for example, in multiple stages or continuously as it goes toward the modulator-side edge 212. In this way, the confinement strength of the high-frequency signal in the conductor pattern 202a or the like can be gradually weakened in multiple stages or continuously, and therefore, it is possible to suppress the reflection of the high-frequency signal according to a rapid change in confinement strength and more effectively suppress the resonance transition.

A reduction in the confinement strength of the high-frequency signal in the vicinity of the modulator-side edge 212 in the conductor pattern 202a or the like, as described above, can be realized by using various configurations, in addition to a configuration in which the reduction is performed by changing the diameter of the via hole which is provided in the ground pattern 218a or the like, as in this embodiment.

Next, modification examples of the optical modulator according to the first embodiment will be described using FIG. 4A to FIG. 11B.

[First Modification Example]

First, a first modification example of the optical modulator 100 according to the first embodiment will be described.

Figure 3:
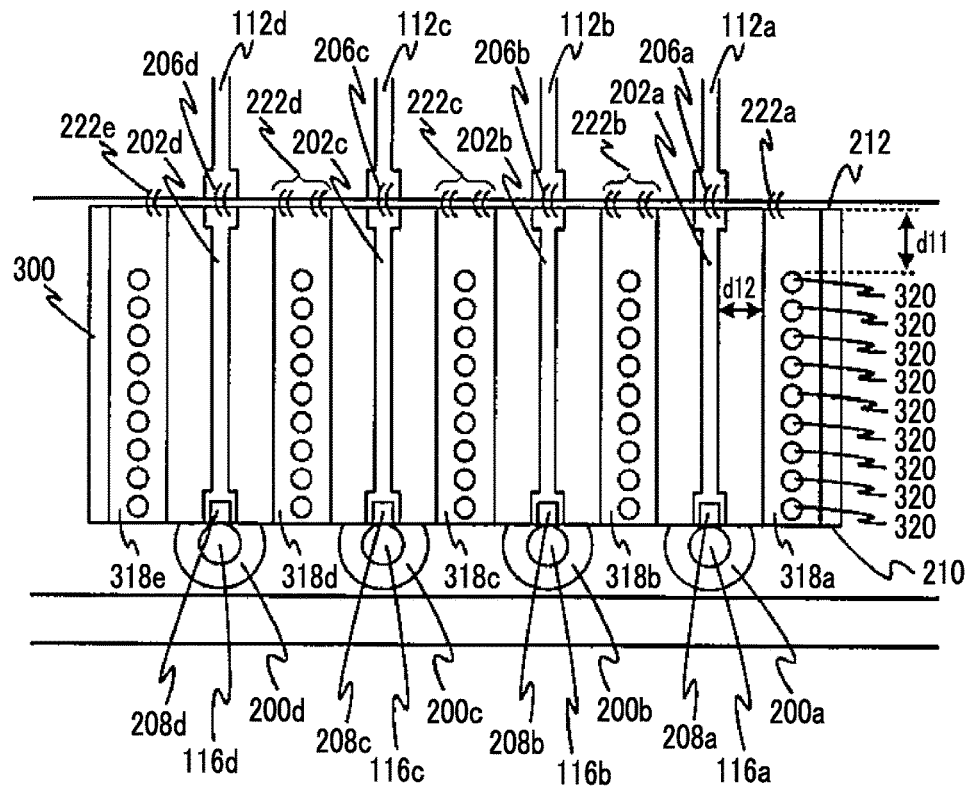
FIG. 3 is a partial detail view corresponding to FIG. 2A, showing a configuration of the periphery of a relay substrate according to a first modification example of the optical modulator according to the first embodiment.

FIG. 3 is a diagram showing the configuration of a relay substrate 300 according to this modification example, which can be used instead of the relay substrate 118, by a partial detail view corresponding to FIG. 2A. In FIG. 3, the same constituent elements as those of the relay substrate 118 shown in FIG. 2A are denoted by the same reference numerals as the reference numerals in FIG. 2A, and the description of FIG. 2A described above is cited.

The relay substrate 300 shown in FIG. 3 has the same configuration as the relay substrate 118 shown in FIG. 2A. However, the relay substrate 300 is different from the relay substrate 118 in that the relay substrate 300 is provided with ground patterns 318a, 318b, 318c, 318d, and 318e instead of the ground patterns 218a, 218b, 218c, 218d, and 218e. The ground patterns 318a, 318b, 318c, 318d, and 318e has the same configuration as the ground patterns 218a, 218b, 218c, 218d, and 218e. However, the disposition of the via holes for electrically connecting the ground patterns 318a, 318b, 318c, 318d, and 318e with the ground patterns (not shown)

provided on the back surface of the relay substrate 300 is different from that in the ground patterns 218a, 218b, 218c, 218d, and 218e.

Hereinafter, the disposition of the via holes will be described taking the ground pattern 318a as an example. The disposition and configurations of the via holes in the other ground patterns 318b, 318c, 318d, and 318e are the same as the disposition and configuration of the via holes in the ground pattern 318a described below.

In the ground pattern 318a, a plurality of via holes 320 are provided, for example, at regular intervals in a region outside the range of a predetermined distance d11 from the modulator-side edge 212. In this way, in the portion in the vicinity of the modulator-side edge 212, the ground pattern 318a or the like on the front surface of the relay substrate 300 and the ground pattern (not shown) on the back surface are not connected to each other. For this reason, similar to the first embodiment, the effect of confining the high-frequency signal propagating through the conductor pattern 202a or the like becomes weak in the portion in the vicinity of the modulator-side edge 212, and thus a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like or a portion in the vicinity of the connection portion is increased compared to the other portion). As a result, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

Here, the predetermined distance d11 can be set such that the ratio of the high-frequency power which is radiated from the conductor pattern 202a or the like in the vicinity of the modulator-side edge 212 (the ratio of the radiation power to the total power) reaches a desired value. For example, the distance d11 is set so as to satisfy a relationship of $$d11 \geq x d12 \qquad (1)$$

with respect to a distance d12 between the conductor pattern adjacent to the ground pattern and the ground pattern (for example, a distance d12 between the conductor pattern 202a adjacent to the ground pattern 318a and the ground pattern 318a), whereby it is possible to efficiently suppress the resonance transition.

In this modification example, the distance between the via holes 320 is set to be constant. However, it may be an indefinite interval.

[Second Modification Example]

Next, a second modification example of the optical modulator 100 according to the first embodiment will be described.

Figure 4:
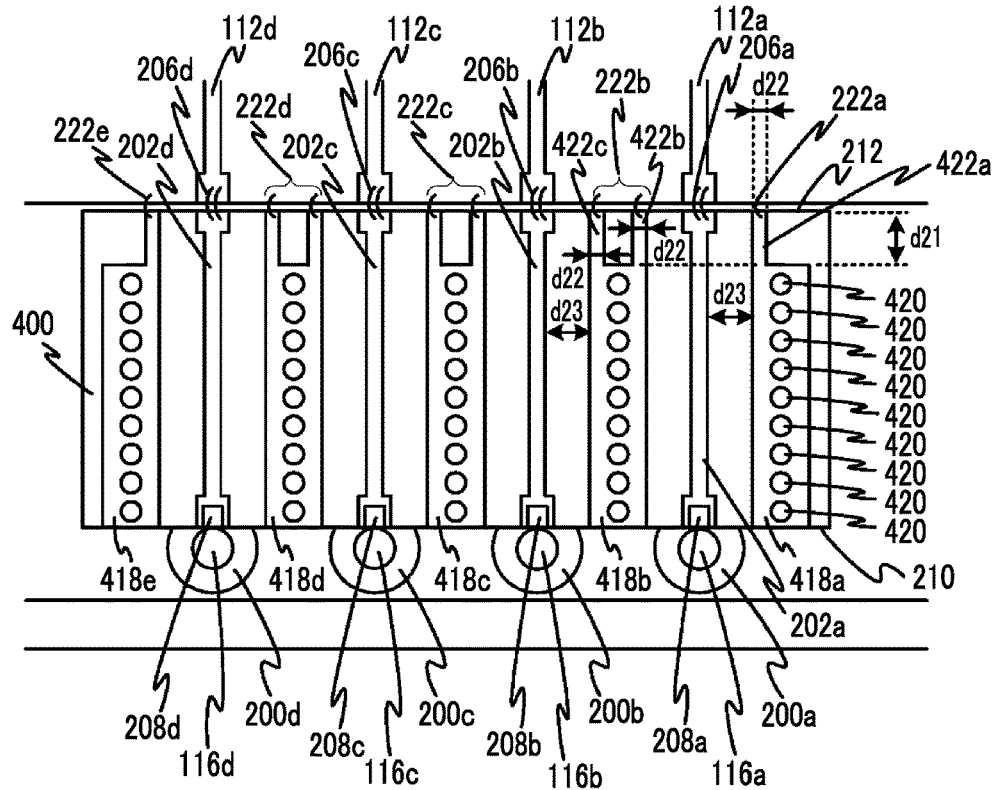
FIG. 4 is a partial detail view corresponding to FIG. 2A, showing a configuration of the periphery of a relay substrate according to a second modification example of the optical modulator according to the first embodiment.

FIG. 4 is a diagram showing the configuration of a relay substrate 400 according to this modification example, which can be used instead of the relay substrate 118, by a partial detail view corresponding to FIG. 2A. In FIG. 4, the same constituent elements as those of the relay substrate 118 shown in FIG. 2A are denoted by the same reference numerals as the reference numerals in FIG. 2A, and the description of FIG. 2A described above is cited.

The relay substrate 400 shown in FIG. 4 has the same configuration as the relay substrate 118 shown in FIG. 2A. However, the relay substrate 400 is different from the relay substrate 118 in that the relay substrate 400 is provided with ground patterns 418a, 418b, 418c, 418d, and 418e instead of the ground patterns 218a, 218b, 218c, 218d, and 218e. The ground patterns 418a, 418b, 418c, 418d, and 418e has the same configuration as the ground patterns 218a, 218b, 218c, 218d, and 218e. However, the shape of an end portion on the modulator-side edge 212 side and the disposition of the via holes are different from those in the ground patterns 218a, 218b, 218c, 218d, and 218e.

Hereinafter, the shape of the ground pattern and the disposition of the via holes will be described taking the ground patterns 418a and 418b as examples.

The ground pattern 418a has a shape in which a part of the conductor portion is cut out so as to leave a portion 422a having a predetermined width d22, which extends to the modulator-side edge 212 along a side of the conductor pattern 202a adjacent thereto on the left side in the drawing, in the range of a predetermined distance d21 from the modulator-side edge 212. Further, a via hole is not provided in the range of the predetermined distance d21 from the modulator-side edge 212, and via holes 420 are provided, for example, at regular intervals in a region outside the range.

Further, the ground pattern 418b has a shape in which a part of the conductor portion is cut out so as to leave two portions 422b and 422c each having the predetermined width d22, which extend to the modulator-side edge 212 along the respective sides of the two conductor patterns 202a and 202b adjacent to each other, in the range of the predetermined distance d21 from the modulator-side edge 212. Further, a via hole is not provided in the range of the predetermined distance d21 from the modulator-side edge 212, and the via holes 420 are provided, for example, at regular intervals in a region outside the range.

Among the other ground patterns, the ground pattern 418e has the conductor pattern 202d adjacent thereto on the right side in the drawing, and therefore, the ground pattern 418e has a configuration in which the ground pattern 418a is inverted left and right. Further, the ground patterns 418c and 418d have the same configuration as the ground pattern 418b.

With the above configuration, in the relay substrate 400, the ground patterns 418a or the like on the front surface of the relay substrate 400 and the ground pattern (not shown) on the back surface are not connected to each other in the portion in vicinity of the modulator-side edge 212 (that is, in the range of the predetermined distance d21), and the area of each of the ground patterns interposing the conductor pattern 202a or the like therebetween from the left and right directions in the portion in the vicinity of the modulator-side edge 212 becomes narrow. As a result, similar to the first embodiment, the effect of confining the high-frequency signal in the vicinity of the modulator-side edge 212 becomes weak in the conductor pattern 202a or the like, and thus a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like ora portion in the vicinity of the connection portion is increased compared to the other portion). In this way, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

Here, the predetermined distance d21 and the width d22 of each of the portions indicated by reference numerals 422a, 422b, and 422c can be set such that the ratio of the high-frequency power which is radiated from the conductor pattern 202a or the like (the ratio of the radiation power to the total power) in the vicinity of the modulator-side edge 212 reaches a desired value. For example, with a configuration made such that the distance d21 and the width d22 satisfy the following expressions (2) and (3) with respect to a width d23 of the conductor pattern adjacent to the ground pattern (for example, a width d23 of the conductor pattern 202a adjacent to the ground pattern 418a), it is possible to efficiently suppress the resonance transition.

$$d21 \geq 2 \times d23 \quad (2)$$

$$d22 \leq 10 \times d23 \quad (3)$$

In this modification example, the distance between the via holes 420 is set to be constant. However, it may be an indefinite interval. Further, in this modification example, the widths of the portions 422a, 422b, and 422c extending to the modulator-side edge 212 along the conductor pattern adjacent thereto are set to be the same width. However, there is no limitation thereto, and for example, the widths can be set to be widths different from each other within a range satisfying the expressions (2) and (3) described above. For example, the widths of the portions indicated by reference numerals 422b and 422c can be set to be the same and the width of the portion indicated by reference numeral 422a can be set to be wider than the above widths. Further, the widths of the extending portions 422a, 422b, and 422c may be changed in a tapered manner along the extension direction or may be changed in a stepwise fashion along the extension direction.

Further, in this modification example, all the widths of the portions 422a, 422b, and 422c extending to the modulator-side edge 212 are set to be the same width. However, there is no limitation thereto, and the widths can be set to be widths different from each other within a range satisfying the expression (2).

Further, in this modification example, the conductor patterns 202a and the like are set to have the same width d23. However, there is no limitation thereto, and they can be set to have widths different from each other. In this case, it is favorable if the width of the extending portion 422b of the ground pattern is set to satisfy the expression (3) with respect to the width of the conductor pattern adjacent to the cutout portion. For example, in a case where the conductor pattern 202b has a width d23' (≠d23), the width of the extending portion 422c can be set to be d22' which satisfies a relationship of d22'≤10×d23', rather than d22.

Further, the length (that is, d21) of the cutout portion of the ground pattern can be set to be in a range which satisfies the expression (2) with respect to the width of the conductor pattern adjacent to the ground pattern (in a case where, like the ground pattern 418b, two conductor patterns adjacent to the grand pattern are provided on both sides in the drawing, the width of the conductor pattern having a larger width, out of them). For example, in a case where the conductor pattern 202b has a width d23' (>d23), the cutout portion between the extending portions 422b and 422c (that is, the lengths in the longitudinal direction of the extending portions 422b and 422c) can be set to be d21' which satisfies a relationship of d21'≥2×d23', rather than d21.

Further, the shape of the ground pattern 418a or the like of this modification example can also be used in a case where the conductor pattern 202a or the like is provided as a coplanar line (for example, a coplanar line rather than a grounded coplanar line) in which a ground pattern is not provided on the back surface of the relay substrate. That is, by simply making the shape of the ground pattern 418a or the like a shape as shown in FIG. 4 without providing a via hole in the ground pattern 418a or the like, it is possible to suppress the resonance transition by radiating a part of the high frequency propagating through the conductor pattern 202a or the like in the vicinity of the modulator-side edge 212.

[Third Modification Example]

Next, a third modification example of the optical modulator 100 according to the first embodiment will be described.

Figure 5:
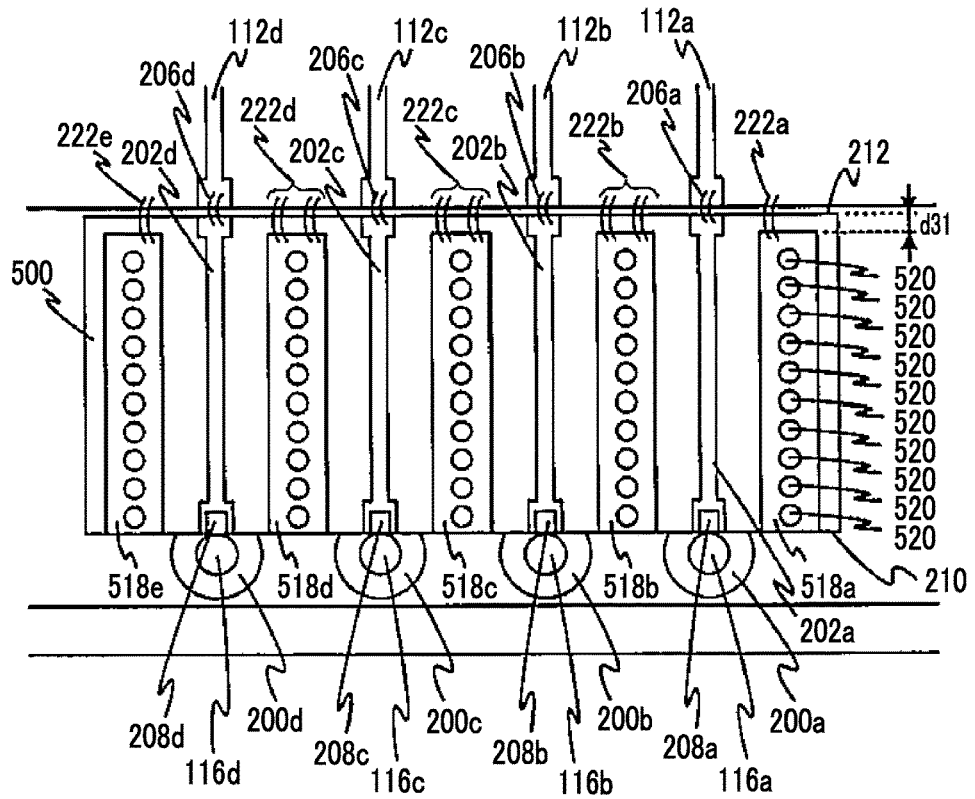
FIG. 5 is a partial detail view corresponding to FIG. 2A, showing a configuration of the periphery of a relay substrate according to a third modification example of the optical modulator according to the first embodiment.

FIG. 5 is a diagram showing the configuration of a relay substrate 500 according to this modification example, which can be used instead of the relay substrate 118, by a partial detail view corresponding to FIG. 2A. In FIG. 5, the same constituent elements as those of the relay substrate 118 shown in FIG. 2A are denoted by the same reference numerals as the reference numerals in FIG. 2A, and the description of FIG. 2A described above is cited.

The relay substrate 500 shown in FIG. 5 has the same configuration as the relay substrate 118 shown in FIG. 2A. However, the relay substrate 500 is different from the relay substrate 118 in that the relay substrate 500 is provided with ground patterns 518a, 518b, 518c, 518d, and 518e instead of the ground patterns 218a, 218b, 218c, 218d, and 218e. The ground patterns 518a, 518b, 518c, 518d, and 518e has the same configuration as the ground patterns 218a, 218b, 218c, 218d, and 218e. However, their shapes and the disposition of the via holes are different from those in the ground patterns 218a, 218b, 218c, 218d, and 218e.

Hereinafter, the shape of the ground pattern and the disposition of the via holes will be described taking the ground pattern 518a as an example.

In the relay substrate 118 shown in FIG. 2A, the ground pattern 218a or the like extends to the modulator-side edge 212, whereas in the relay substrate 500 according to this modification example, the ground pattern 518a does not extend to the modulator-side edge 212 and extends to a position of a predetermined distance d31 from the modulator-side edge 212. Further, the via holes which are provided in the ground pattern 518a do not need to be necessarily different in diameter from each other, and in this modification example, for example, via holes 520 having the same diameter are disposed at the same intervals. The configurations of the other ground patterns 518b, 518c, 518d, and 518e are the same as the configuration of the ground pattern 518a.

With the above configuration, in the relay substrate 500, a portion which is not interposed between the ground pattern 518a and the like in the portion (that is, a range of a predetermined distance d31) in the vicinity of the modulator-side edge 212 is present in the conductor pattern 202a or the like. As a result, similar to the first embodiment, the effect of confining the high-frequency signal in the vicinity of the modulator-side edge 212 becomes weak in the conductor pattern 202a or the like, and thus a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like or a portion in the vicinity of the connection portion is increased compared to the other portion). In this way, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

Here, if the predetermined distance d31 is too large, the ratio of the high-frequency radiation power from the conductor pattern 202a or the like becomes too large, thereby affecting the propagation characteristics, and therefore, suitably, in a frequency range where an operating frequency exceeds 10 GHz, for example, it is desirable that the predetermined distance d31 is set to satisfy a relationship of $$d31 \leq 100\ \mu m \tag{4}$$

In this modification example, the distance between the via holes 520 is set to be constant. However, it may be an indefinite interval.

Further, the shape of the ground pattern 518a or the like of this modification example can also be used in a case where the conductor pattern 202a or the like is provided as a coplanar line (for example, a coplanar line rather than a grounded coplanar line) in which a ground pattern is not provided on the back surface of the relay substrate. That is, by simply making the shape of the ground pattern 518a or the like a shape as shown in FIG. 5 without providing a via hole in the ground pattern 518a or the like, it is possible to suppress the resonance transition by radiating a part of the high frequency propagating through the conductor pattern 202a or the like in the vicinity of the modulator-side edge 212.

[Fourth Modification Example]

Next, a fourth modification example of the optical modulator 100 according to the first embodiment will be described.

Figure 6:
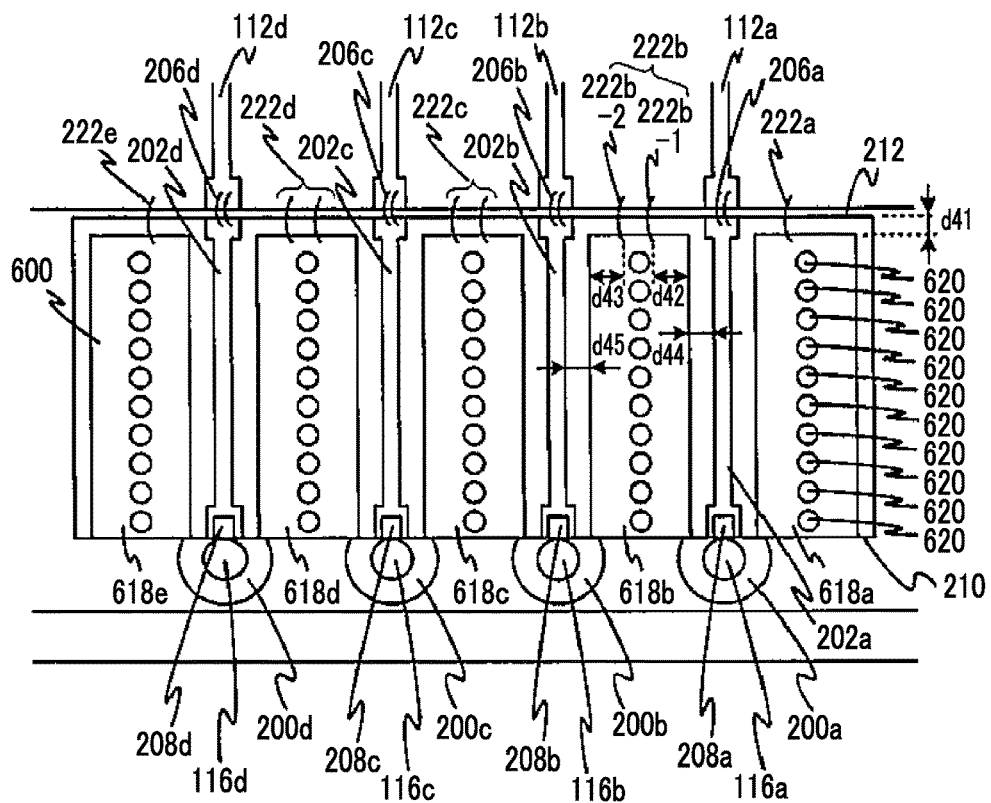
FIG. 6 is a partial detail view corresponding to FIG. 2A, showing a configuration of the periphery of a relay substrate according to a fourth modification example of the optical modulator according to the first embodiment.

FIG. 6 is a diagram showing the configuration of a relay substrate 600 according to this modification example, which can be used instead of the relay substrate 118, by a partial detail view corresponding to FIG. 2A. In FIG. 6, the same constituent elements as those of the relay substrate 118 shown in FIG. 2A are denoted by the same reference numerals as the reference numerals in FIG. 2A, and the description of FIG. 2A described above is cited.

The relay substrate 600 shown in FIG. 6 has the same configuration as the relay substrate 118 shown in FIG. 2A. However, the relay substrate 600 is different from the relay substrate 118 in that the relay substrate 600 is provided with ground patterns 618a, 618b, 618c, 618d, and 618e instead of the ground patterns 218a, 218b, 218c, 218d, and 218e. The ground patterns 618a, 618b, 618c, 618d, and 618e has the same configuration as the ground patterns 218a, 218b, 218c, 218d, and 218e. However, their shapes and the disposition of the via holes are different from those in the ground patterns 218a, 218b, 218c, 218d, and 218e. Further, the positions of the conductor wires 222a, 222b, 222c, 222d, and 222e which connect the ground patterns 618a, 618b, 618c, 618d, and 618e and the ground electrodes (not shown) on the optical modulation element 102 are different from the case of the relay substrate 118 in FIG. 2A.

Hereinafter, the shape of the ground pattern, the disposition of the via holes, and the disposition of the conductor wires will be described taking the ground pattern 618b as an example.

In the relay substrate 600 according to this modification example shown in FIG. 6, the ground pattern 618b extends to a position away by a predetermined distance d41 from the modulator-side edge 212, similar to the ground pattern 518b or the like of the relay substrate 500 shown in FIG. 5. It is desirable that the predetermined distance d41 is set to satisfy a relationship of d41≤100 μm, for example, similarly to d31 in the third modification example described above.

Further, in this modification example, the connection position with the ground pattern 618b, of a conductor wire 222b-1 closest to the conductor pattern 202a adjacent to the ground pattern 618b, out of the conductor wires 222b connecting the ground pattern 618b and the ground electrode (not shown) of the optical modulation element 102, is away by a predetermined distance d42 from a side facing the conductor pattern 202a adjacent to the ground pattern 618b, among the sides of the ground pattern 618b.

Similarly, the connection position with the ground pattern 618b, of a conductor wire 222b-2 closest to the conductor pattern 202b adjacent to the ground pattern 618b, out of the conductor wires 222b connecting the ground pattern 618b and the ground electrode (not shown) of the optical modulation element 102, is away by a predetermined distance d43 from a side facing the conductor pattern 202b adjacent to the ground pattern 618b, among the sides of the ground pattern 618b.

In general, a conductor wire which connects each of ground patterns interposing a conductor pattern that is a propagation path for a high-frequency signal therebetween, and a ground electrode of an optical modulation element is fixed and connected to the portion of the ground pattern as close as possible to the conductor pattern adjacent to the ground pattern, in order to enhance the effect of confining the high-frequency signal in the conductor pattern. In contrast, in this modification example, as described above, the conductor wires 222b-1 and 222b-2 connecting the ground pattern 618b and the ground electrode (not shown) of the optical modulation element 102 are not connected to the portions of the ground pattern 618b in the immediate vicinity of the conductor patterns 202a and 202b adjacent to the ground pattern 618b, but are connected to the positions away by the predetermined distances d42 and d43 from the sides facing the conductor patterns 202a and 202b adjacent to the ground pattern 618b, among the sides of the ground pattern 618b.

For this reason, in the relay substrate 600 according to this modification example, the ground pattern 618b extends to the position away by the predetermined distance d41 from the modulator-side edge, and thus the effect of confining the high-frequency signal in the vicinity of the modulator-side edge 212 becomes weak in the conductor pattern 202a or the like, and a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like or a portion in the vicinity of the connection portion is increased compared to the other portion). As a result, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

Here, it is preferable that each of the predetermined distances d42 and d43 is suitably greater than or equal to each of distances d44 and d45 between the edges of the conductor patterns 202a and 202b adjacent to the ground pattern 618b and the corresponding edges of the ground pattern 618b, which face the above edges, in order to make the ratio of the high-frequency radiation power from the conductor pattern 202a or the like a significant level. That is, it is desirable that the predetermined distances d42 and d43 are set to satisfy relationships of $$d42 \geq d44 \quad (5)$$

and $$d43 \geq d45 \quad (6)$$

In this modification example, a configuration in which the two conductor wires 202b-1 and 202b-2 are connected to the ground pattern 618b is made. However, the number of conductor wires is not limited thereto and can be set to be an arbitrary number. That is, for example, in a case where four conductor wires are connected to the ground pattern 618b, the conductor wires closest to the conductor patterns 202a and 202b adjacent to the ground pattern 618b, among the four conductor wires, are set to be the conductor wires 202b-1 and 202b-2, respectively, and it is favorable if the conductor wires are disposed such that the above expressions (5) and (6) are satisfied. Both the expressions (5) and (6) do not need to be satisfied, and it is possible to obtain a certain effect by satisfying one of the expressions. This also applies to other ground patterns.

The configurations of the other ground patterns 618a, 618c, 618d, and 618e are the same as the configuration of the ground pattern 618b described above. Here, the ground patterns 618a and 618e respectively have the conductor patterns 202a and 202d adjacent thereto only on one side of the left and the right, and therefore, it is favorable if the positions of the conductor wires 222a and 222e are set such that the above expression (5) or (6) is satisfied with respect to the distances to the conductor patterns 202a and 202d which are respectively adjacent to the ground patterns 618a and 618e.

The shape of the ground pattern 618a or the like of this modification example can also be used in a case where the conductor pattern 202a or the like is provided as a coplanar line (for example, a coplanar line rather than a grounded coplanar line) in which a ground pattern is not provided on the back surface of the relay substrate. That is, by simply making the shape of the ground pattern 618a or the like a shape as shown in FIG. 6 without providing a via hole in the ground pattern 618a or the like, it is possible to suppress the resonance transition by radiating a part of the high frequency propagating through the conductor pattern 202a or the like in the vicinity of the modulator-side edge 212.

[Fifth Modification Example]

Next, a fifth modification example of the optical modulator 100 according to the first embodiment will be described.

Figure 7A:
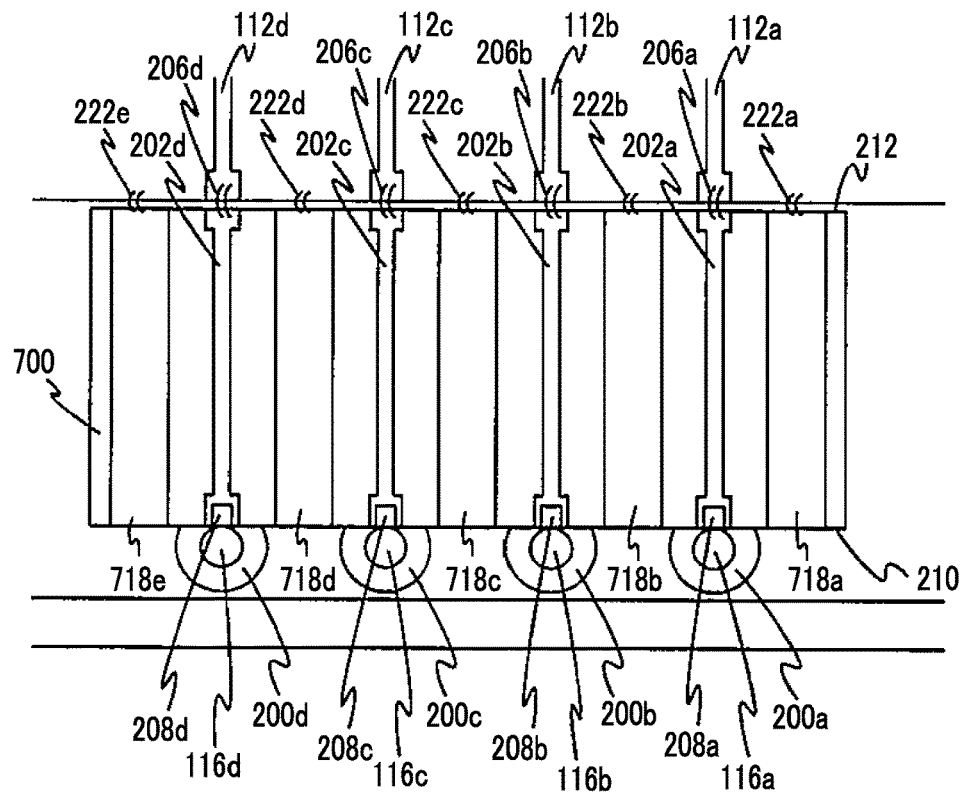
FIG. 7A is a partial detail view corresponding to FIG. 2A, showing a configuration of the periphery of a relay substrate according to a fifth modification example of the optical modulator according to the first embodiment.
Figure 7B:
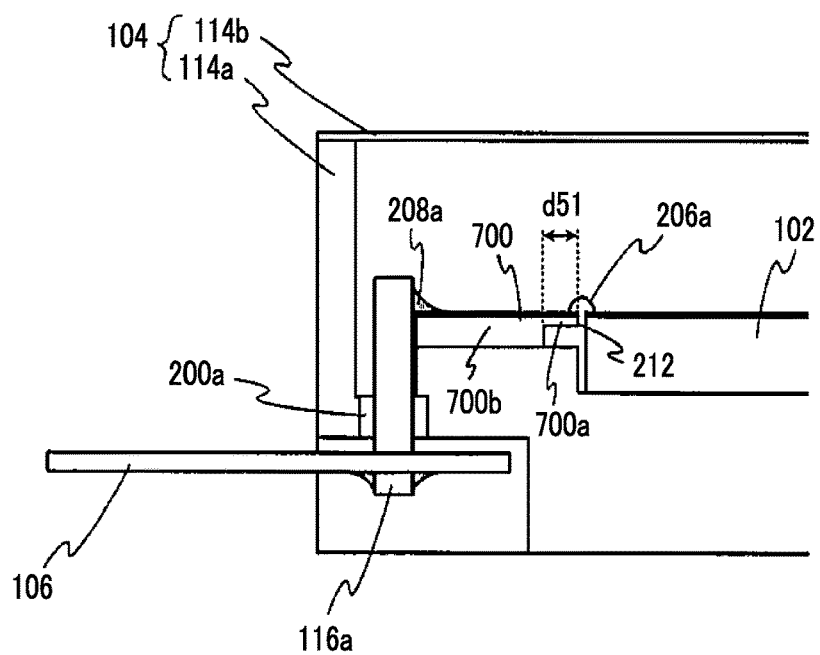
FIG. 7B is a partial detail view corresponding to FIG. 2B, showing a configuration of a cross section of the periphery of the relay substrate according to the fifth modification example of the optical modulator according to the first embodiment.

FIG. 7A and FIG. 7B are diagrams showing the configuration of a relay substrate 700 according to this modification example, which can be used instead of the relay substrate 118, by partial detail views corresponding to FIG. 2A and FIG. 2B, respectively. In FIG. 7A and FIG. 7B, the same constituent elements as those of the relay substrate 118 shown in FIG. 2A and FIG. 2B are denoted by the same reference numerals as the reference numerals in FIG. 2A and FIG. 2B, and the description of FIG. 2A and FIG. 2B described above is cited.

The relay substrate 700 shown in FIG. 7A and FIG. 7B has the conductor patterns 202a, 202b, 202c, and 202d, similar to the relay substrate 118. However, the conductor pattern 202a or the like is different from that of the relay substrate 118 in that the conductor pattern 202a or the like is configured so as to function as a grounded coplanar line when the back surface of the relay substrate 700 is in contact with the case 114a connected to a ground. In order to realize this, the relay substrate 700 is provided with ground patterns 718a, 718b, 718c, 718d, and 718e instead of the ground patterns 218a, 218b, 218c, 218d, and 218e. That is, the conductor patterns 202a, 202b, 202c, and 202d configure the grounded coplanar lines together with the ground patterns 718a, 718b, 718c, 718d, and 718e and the case 114a which is a structure connected to a ground potential coming into contact with the back surface of the relay substrate 700.

The ground patterns 718a, 718b, 718c, 718d, and 718e have the same configurations as the ground patterns 218a, 218b, 218c, 218d, and 218e, respectively. However, the distance between each of the ground patterns 718a, 718b, 718c, 718d, and 718e and each of the conductor patterns 202a, 202b, 202c, and 202d is different from that in the ground patterns 218a, 218b, 218c, 218d, and 218e. That is, the ground patterns 718a, 718b, 718c, 718d, and 718e are designed such that the conductor patterns 202a, 202b, 202c, and 202d function as the grounded coplanar lines when the back surface of the relay substrate 700 is in contact with the case 114a or when the back surface of the relay substrate 700 is in contact with the case 114a and is electrically connected to the case 114a by applying a conductive adhesive or the like between the back surface of the relay substrate 700 and the case 114a. Further, the ground patterns 718a, 718b, 718c, 718d, and 718e may not have via holes, unlike the ground patterns 218a, 218b, 218c, 218d, and 218e.

In particular, the relay substrate 700 has a shape in which the back surface thereof is scraped off over a predetermined distance d51 from the modulator-side edge 212 (the upper edge of the relay substrate 700 shown in FIG. 7A, that is, the edge on the right side in FIG. 7B), as shown in FIG. 7B, and the thickness of a substrate portion 700a in the range of the distance d51 from the modulator-side edge 212 is made to be thinner than the thickness of another substrate portion 700b. For this reason, when the relay substrate 700 is mounted on the case 114a, the back surface thereof is not electrically connected to the case 114a over the range of the predetermined distance d51 from the modulator-side edge 212.

For this reason, in the relay substrate 700, in the conductor pattern 202a or the like, the effect of confining the high-frequency signal by the ground potential of the case 114a becomes weak in the vicinity of the modulator-side edge 212, and thus a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like or a portion in the vicinity of the connection portion is increased compared to the other portion). As a result, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

In the relay substrate 700 of this modification example, the conductor patterns 202a, 202b, 202c, and 202d have been described as being configured so as to function as the grounded coplanar lines when the back surface of the relay substrate 700 is in electrical contact with the case 114a. However, there is no limitation thereto, and they may be configured as normal coplanar lines (not the grounded coplanar lines). Even in this case, since the electrical positional relationship (or connection relationship) between the relay substrate 700 and a ground potential conductor (that is, the case 114a) in the vicinity of the modulator-side edge 212 changes compared to other portions (that is, since the relay substrate 700 is not in electrical contact with the case 114a in the range of the predetermined distance d51 from the modulator-side edge 212), it is possible to substantially suppress the resonance transition by generating the radiation of the high frequency from the conductor pattern 202a or the like in the vicinity of the modulator-side edge 212.

[Sixth Modification Example]

Next, a sixth modification example of the optical modulator 100 according to the first embodiment will be described.

Figure 8A:
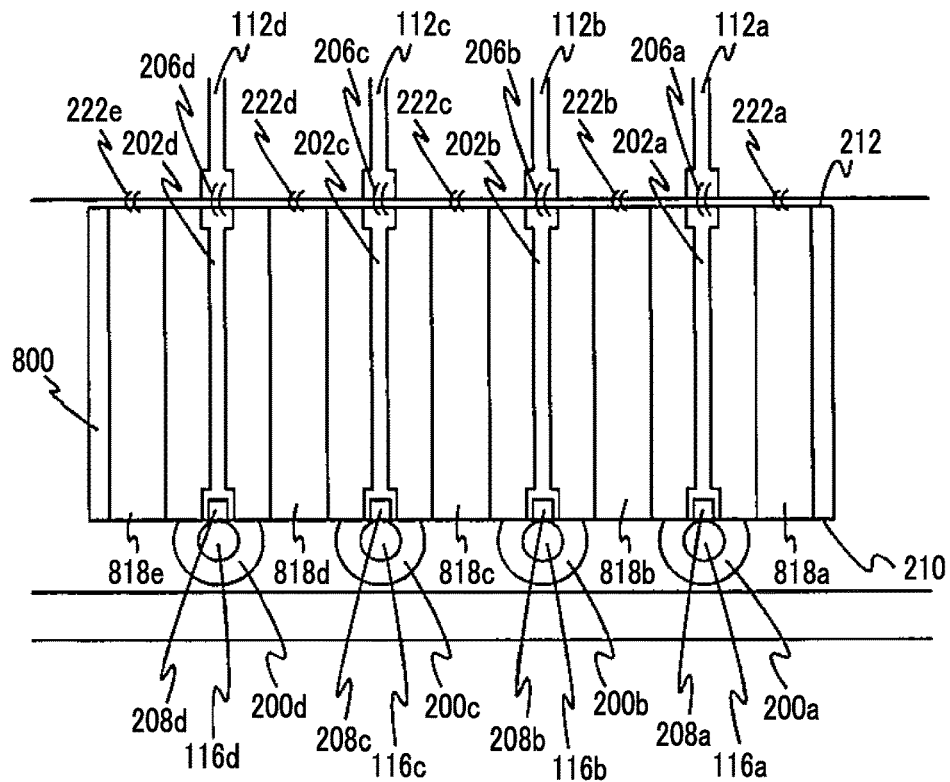
FIG. 8A is a partial detail view corresponding to FIG. 2A, showing a configuration of the periphery of a relay substrate according to a sixth modification example of the optical modulator according to the first embodiment.
Figure 8B:
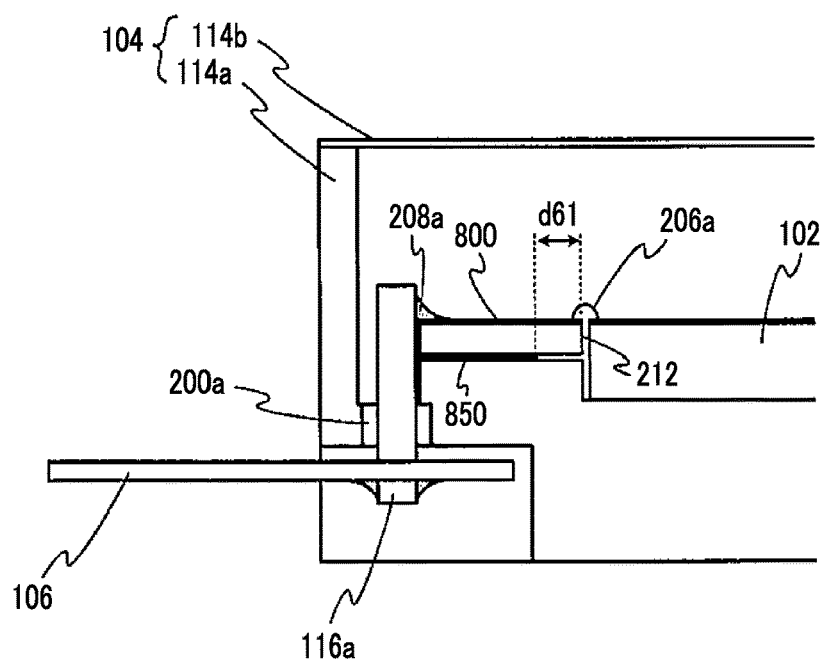
FIG. 8B is a partial detail view corresponding to FIG. 2B, showing a configuration of a cross section of the periphery of the relay substrate according to the sixth modification example of the optical modulator according to the first embodiment.

FIG. 8A and FIG. 8B are diagrams showing the configuration of a relay substrate 800 according to this modification example, which can be used instead of the relay substrate 118, by partial detail views corresponding to FIG. 2A and FIG. 2B, respectively. In FIG. 8A and FIG. 8B, the same constituent elements as those of the relay substrate 118 shown in FIG. 2A and FIG. 2B are denoted by the same reference numerals as the reference numerals in FIG. 2A and FIG. 2B, and the description of FIG. 2A and FIG. 2B described above is cited.

The relay substrate 800 shown in FIG. 8A and FIG. 8B has the conductor patterns 202a, 202b, 202c, and 202d, similar to the relay substrate 118. However, the conductor pattern 202a or the like is configured so as to function as the grounded coplanar lines when the back surface of the relay substrate 800 is in contact with the case 114a connected to a ground. In order to realize this, the relay substrate 800 is provided with ground patterns 818a, 818b, 818c, 818d, and 818e instead of the ground patterns 218a, 218b, 218c, 218d, and 218e. That is, the conductor patterns 202a, 202b, 202c, and 202d configure the grounded coplanar lines together with the ground patterns 818a, 818b, 818c, 818d, and 818e and the case 114a which is a structure connected to a ground potential coming into contact with the back surface of the relay substrate 800.

The ground patterns 818a, 818b, 818c, 818d, and 818e have the same configurations as the ground patterns 218a, 218b, 218c, 218d, and 218e, respectively. However, the distance between each of the ground patterns 818a, 818b, 818c, 818d, and 818e and each of the conductor patterns 202a, 202b, 202c, and 202d is different from that in the ground patterns 218a, 218b, 218c, 218d, and 218e. That is, the ground patterns 818a, 818b, 818c, 818d, and 818e are designed such that the conductor patterns 202a, 202b, 202c, and 202d function as the grounded coplanar lines when the back surface of the relay substrate 800 is in contact with the case 114a or when the back surface of the relay substrate 800 is in contact with the case 114a and is electrically connected to the case 114a with, for example, a conductive material such as a conductive adhesive interposed therebetween. Further, the ground patterns 818a, 818b, 818c, 818d, and 818e may not have via holes, unlike the ground patterns 218a, 218b, 218c, 218d, and 218e.

In particular, the back surface of the relay substrate 800 is fixed and electrically connected to the case 114a by a conductive material 850 (for example, a brazing material, solder, a conductive adhesive, or the like). However, as shown in FIG. 8B, the conductive material 850 is not applied in a range within a predetermined distance d61 from the modulator-side edge 212, of the back surface, and thus the electrical connection between the range and the case 114a is in an incomplete state (for example, a state where the contact area is small (in the sense that contact of the entire surface is not made due to surface unevenness) or the contact resistance is large, compared to the connection through a conductive adhesive).

For this reason, in the relay substrate 800, in the conductor pattern 202a or the like, the effect of confining the high-frequency signal by the ground potential of the case 114a becomes weak in the vicinity of the modulator-side edge 212, and therefore, a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like or a portion in the vicinity of the connection portion is increased compared to the other portion). As a result, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

In the relay substrate 800 of this modification example, the conductor patterns 202a, 202b, 202c, and 202d have been described as being configured so as to function as the grounded coplanar lines when the back surface of the relay substrate 800 is in electrical contact with the case 114a. However, there is no limitation thereto, and they may be configured as normal coplanar lines (not the grounded coplanar lines). Even in this case, since the electrical positional relationship (or connection relationship) between the relay substrate 800 and a ground potential conductor (that is, the case 114a) in the vicinity of the modulator-side edge 212 changes compared to other portions (that is, since the electrical contact with the case 114a is incomplete in the range of the predetermined distance d61 from the modulator-side edge 212), it is possible to substantially suppress the resonance transition by generating the radiation of the high frequency from the conductor pattern 202a or the like in the vicinity of the modulator-side edge 212.

[Seventh Modification Example]

Next, a seventh modification example of the optical modulator 100 according to the first embodiment will be described.

Figure 9A:
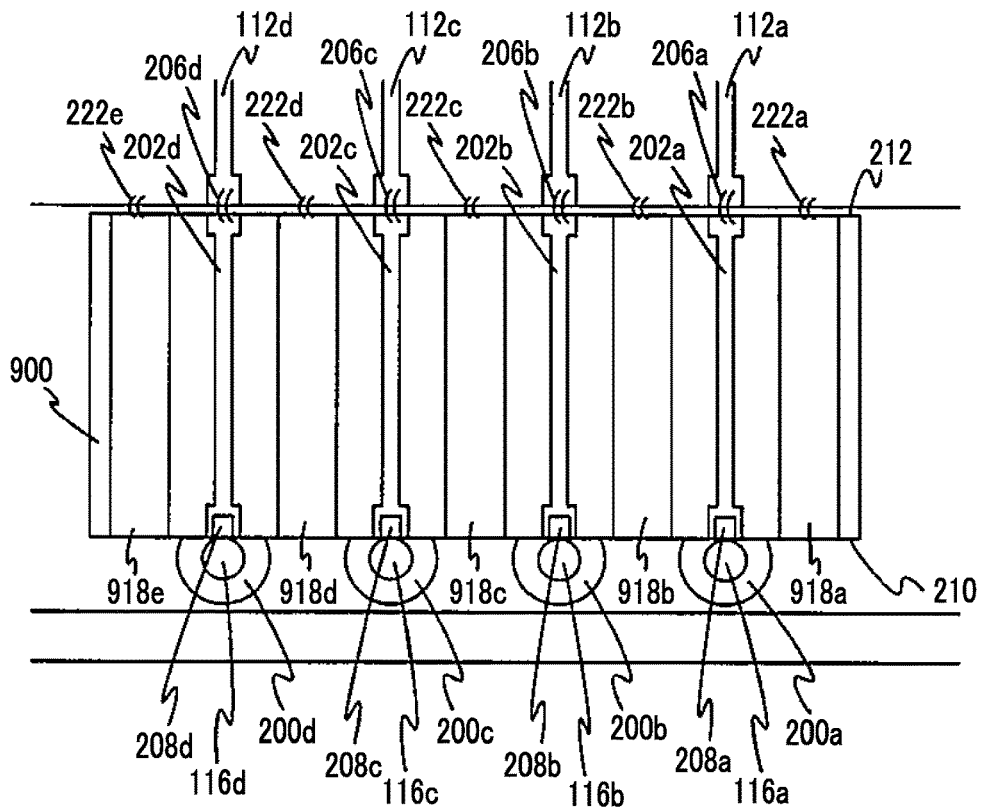
FIG. 9A is a partial detail view corresponding to FIG. 2A, showing a configuration of the periphery of a relay substrate according to a seventh modification example of the optical modulator according to the first embodiment.
Figure 9B:
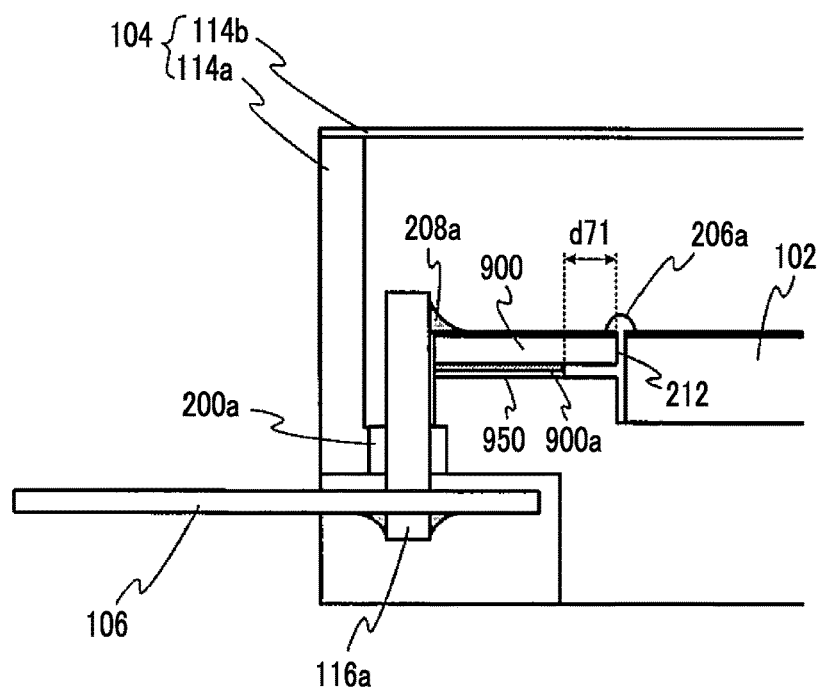
FIG. 9B is a partial detail view corresponding to FIG. 2B, showing a configuration of a cross section of the periphery of the relay substrate according to the seventh modification example of the optical modulator according to the first embodiment.

FIG. 9A and FIG. 9B are diagrams showing the configuration of a relay substrate 900 according to this modification example, which can be used instead of the relay substrate 118, by partial detail views corresponding to FIG. 2A and FIG. 2B, respectively. In FIG. 9A and FIG. 9B, the same constituent elements as those of the relay substrate 118 shown in FIG. 2A and FIG. 2B are denoted by the same reference numerals as the reference numerals in FIG. 2A and FIG. 2B, and the description of FIG. 2A and FIG. 2B described above is cited.

The relay substrate 900 shown in FIG. 9A and FIG. 9B has the conductor patterns 202a, 202b, 202c, and 202d, similar to the relay substrate 118. However, the conductor pattern 202a or the like is configured so as to function as the grounded coplanar lines when the back surface of the relay substrate 900 is in contact with the case 114a connected to a ground. In order to realize this, the relay substrate 900 is provided with ground patterns 918a, 918b, 918c, 918d, and 918e instead of the ground patterns 218a, 218b, 218c, 218d, and 218e. That is, the conductor patterns 202a, 202b, 202c, and 202d configure the grounded coplanar lines together with the ground patterns 918a, 918b, 918c, 918d, and 918e and the case 114a which is a structure connected to a ground potential coming into contact with the back surface of the relay substrate 900.

The ground patterns 918a, 918b, 918c, 918d, and 918e have the same configurations as the ground patterns 218a, 218b, 218c, 218d, and 218e, respectively. However, the distance between each of the ground patterns 918a, 918b, 918c, 918d, and 918e and each of the conductor patterns 202a, 202b, 202c, and 202d is different from that in the ground patterns 218a, 218b, 218c, 218d, and 218e. That is, the ground patterns 918a, 918b, 918c, 918d, and 918e are designed such that the conductor patterns 202a, 202b, 202c, and 202d function as the grounded coplanar lines when the back surface of the relay substrate 900 is in contact with the case 114a. Further, the ground patterns 918a, 918b, 918c, 918d, and 918e may not have via holes, unlike the ground patterns 218a, 218b, 218c, 218d, and 218e.

In particular, as shown in FIG. 9B, a metal pattern 900a (a hatched portion in the drawing) is provided on the back surface of the relay substrate 900 with the exception of a range within a predetermined distance d71 from the modulator-side edge 212. Then, in the relay substrate 900, the metal pattern 900a is fixed and electrically connected to the case 114a by a conductive material 950 (for example, a brazing material, solder, a conductive adhesive, or the like). That is, the back surface of the relay substrate 900 is in a state where the electrical connection with the case 114a is incomplete within the range of the predetermined distance d71 from the modulator-side edge 212 (that is, a state where the contact area is small (in the sense that contact of the entire surface is not made due to surface unevenness) or the contact resistance is large, compared to the electrical connection with the case 114a outside the range of the predetermined distance d71).

For this reason, in the relay substrate 900, in the conductor pattern 202a or the like, the effect of confining the high-frequency signal by the ground potential of the case 114a becomes weak in the vicinity of the modulator-side edge 212, and thus a part of the high-frequency signal propagating through the conductor pattern 202a or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202a or the like and the RF electrode 112a or the like or a portion in the vicinity of the connection portion is increased compared to the other portion). As a result, the amount of reflection of the high-frequency signals which are reflected at the connection portions between the conductor patterns 202a, 202b, 202c, and 202d and the RF electrodes 112a, 112b, 112c, and 112d, among the high-frequency signals propagating through the conductor patterns 202a, 202b, 202c, and 202d, is reduced, and the resonance transition between the conductor patterns 202a, 202b, 202c, and 202d is suppressed.

In the relay substrate 900 of this modification example, the conductor patterns 202a, 202b, 202c, and 202d have been described as being configured so as to function as the grounded coplanar lines when the back surface of the relay substrate 900 is in electrical contact with the case 114a. However, there is no limitation thereto, and they may be configured as normal coplanar lines (not the grounded coplanar lines). Even in this case, since the electrical positional relationship (or connection relationship) between the relay substrate 900 and a ground potential conductor (that is, the case 114a) in the vicinity of the modulator-side edge 212 changes compared to other portions (that is, since the electrical contact with the case 114a is incomplete in the range of the predetermined distance d71 from the modulator-side edge 212), it is possible to substantially suppress the resonance transition by generating the radiation of the high frequency from the conductor pattern 202a or the like in the vicinity of the modulator-side edge 212.

[Eighth Modification Example]

Next, an eighth modification example of the optical modulator 100 according to the first embodiment will be described.

Figure 10A:
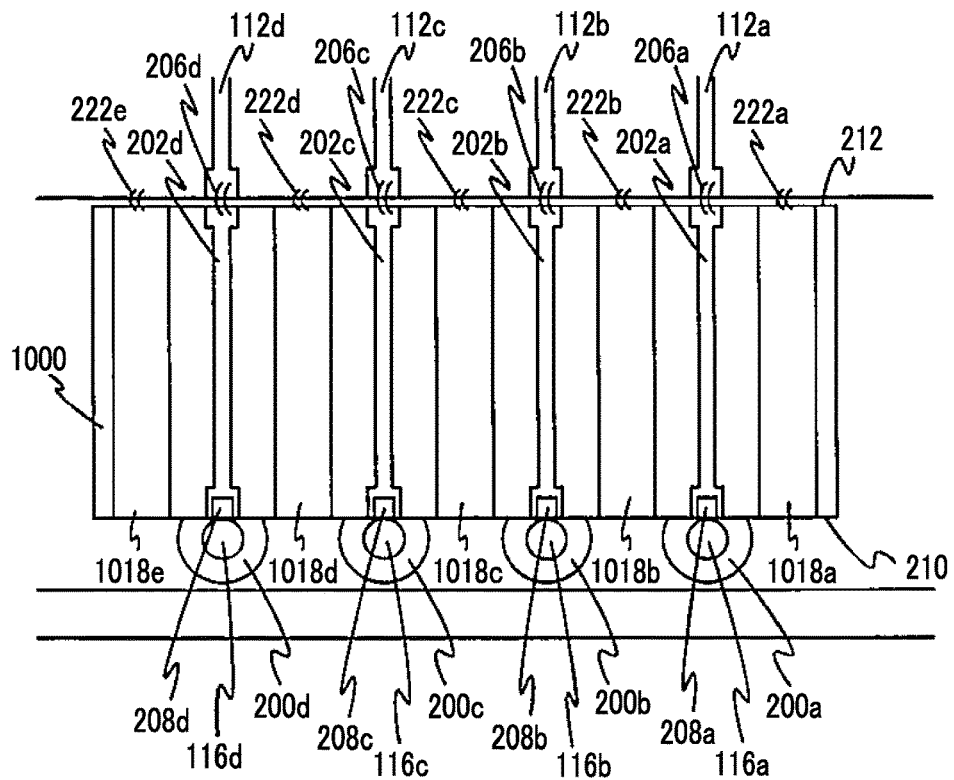
FIG. 10A is a partial detail view corresponding to FIG. 2A, showing a configuration of the periphery of a relay substrate according to an eighth modification example of the optical modulator according to the first embodiment.
Figure 10B:
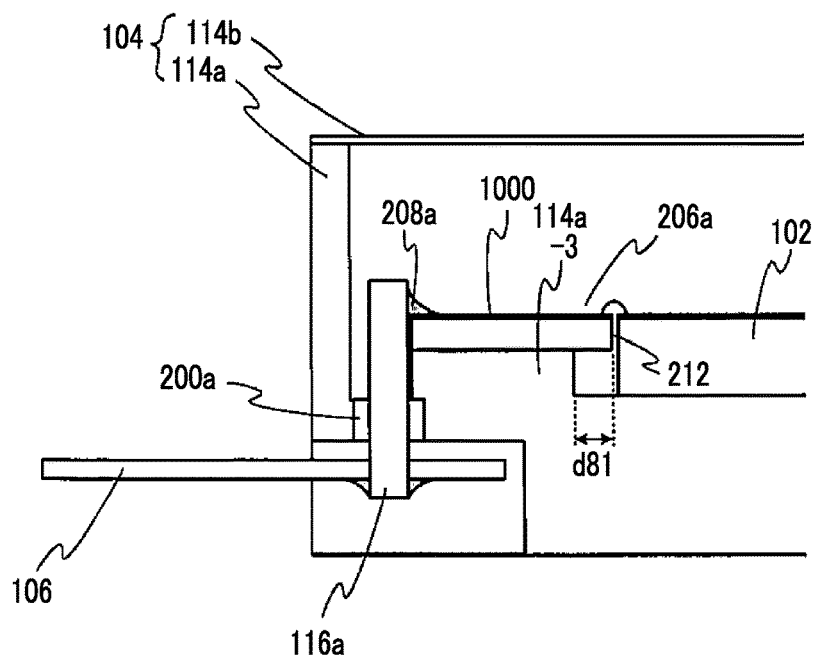
FIG. 10B is a partial detail view corresponding to FIG. 2B, showing a configuration of a cross section of the periphery of the relay substrate according to the eighth modification example of the optical modulator according to the first embodiment.

FIG. 10A and FIG. 10B are diagrams showing the configuration of a relay substrate 1000 according to this modification example, which can be used instead of the relay substrate 118, by partial detail views corresponding to FIG. 2A and FIG. 2B, respectively.

In FIG. 10A and FIG. 10B, the same constituent elements as those of the relay substrate 118 shown in FIG. 2A and FIG. 2B are denoted by the same reference numerals as the reference numerals in FIG. 2A and FIG. 2B, and the description of FIG. 2A and FIG. 2B described above is cited.

The relay substrate 1000 shown in FIG. 10A and FIG. 10B has the conductor patterns 202a, 202b, 202c, and 202d, similar to the relay substrate 118. However, the conductor pattern 202a or the like is configured so as to function as the grounded coplanar lines when the back surface of the relay substrate 1000 is in contact with the case 114a connected to the ground. In order to realize this, the relay substrate 1000 is provided with ground patterns 1018a, 1018b, 1018c, 1018*d*, and 1018*e* instead of the ground patterns 218*a*, 218*b*, 218*c*, 218*d*, and 218*e*. That is, the conductor patterns 202*a*, 202*b*, 202*c*, and 202*d* configure the grounded coplanar lines together with the ground patterns 1018*a*, 1018*b*, 1018*c*, 1018*d*, and 1018*e* and the case 114*a* which is a structure connected to a ground potential coming into contact with the back surface of the relay substrate 1000.

The ground patterns 1018*a*, 1018*b*, 1018*c*, 1018*d*, and 1018*e* have the same configurations as the ground patterns 218*a*, 218*b*, 218*c*, 218*d*, and 218*e*, respectively. However, the distance between each of the ground patterns 1018*a*, 1018*b*, 1018*c*, 1018*d*, and 1018*e* and each of the conductor patterns 202*a*, 202*b*, 202*c*, and 202*d* is different from that in the ground patterns 218*a*, 218*b*, 218*c*, 218*d*, and 218*e*. That is, the ground patterns 1018*a*, 1018*b*, 1018*c*, 1018*d*, and 1018*e* are designed such that the conductor patterns 202*a*, 202*b*, 202*c*, and 202*d* function as the grounded coplanar lines when the back surface of the relay substrate 1000 is in contact with the case 114*a* or when the back surface of the relay substrate 1000 is in contact with the case 114*a* and is electrically connected to the case 114*a* by applying, for example, a conductive adhesive or the like between the back surface of the relay substrate 1000 and the case 114*a*. Further, the ground patterns 1018*a*, 1018*b*, 1018*c*, 1018*d*, and 1018*e* may not have via holes, unlike the ground patterns 218*a*, 218*b*, 218*c*, 218*d*, and 218*e*.

In particular, the relay substrate 1000 is configured so as to protrude from a pedestal part 114*a*-3 of the case 114*a* over a predetermined distance d81 in the left-right direction in the FIG. 10B (that is, configured such that the portion in the range of the predetermined distance d81 in the left-right direction from the modulator-side edge 212 protrudes from the pedestal part 114*a*-3) when the length of the relay substrate 1000 along the left-right direction is longer than that of the relay substrate 118 and the relay substrate 1000 is fixed to the case 114*a*.

For this reason, in the relay substrate 1000, in the conductor pattern 202*a* or the like, the effect of confining the high-frequency signal by the ground potential of the case 114*a* becomes weak in the vicinity of the modulator-side edge 212, and thus a part of the high-frequency signal propagating through the conductor pattern 202*a* or the like is radiated in the vicinity of the modulator-side edge 212 (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202*a* or the like and the RF electrode 112*a* or the like or a portion in the vicinity of the connection portion is increased compared to the other portion). As a result, the amount of reflection of the high-frequency signals which are reflected at the connection portions between the conductor patterns 202*a*, 202*b*, 202*c*, and 202*d* and the RF electrodes 112*a*, 112*b*, 112*c*, and 112*d*, among the high-frequency signals propagating through the conductor patterns 202*a*, 202*b*, 202*c*, and 202*d*, is reduced, and the resonance transition between the conductor patterns 202*a*, 202*b*, 202*c*, and 202*d* is suppressed.

In this embodiment, a configuration is made such that the length of the relay substrate 1000 along the left-right direction in FIG. 10B is made to be longer than the length of the relay substrate 118, so that the portion in the predetermined distance d81 from the modulator-side edge 212 along the left-right direction protrudes from the pedestal part 114*a*-3 of the case 114*a*. However, there is no limitation thereto, and a configuration may be made such that the length of the pedestal part 114*a*-3 along the left-right direction in FIG. 10B is made to be shorter than the length of the relay substrate 1000, so that the portion in the predetermined distance d81 from the modulator-side edge 212 along the left-right direction protrudes from the pedestal part 114*a*-3 of the case 114*a*.

Further, in the relay substrate 1000 of this modification example, the conductor patterns 202*a*, 202*b*, 202*c*, and 202*d* have been described as being configured as the grounded coplanar lines when the back surface of the relay substrate 1000 is in electrical contact with the case 114*a*. However, there is no limitation thereto, and they may be configured as normal coplanar lines (not the grounded coplanar lines). Even in this case, since the electrical positional relationship (or connection relationship) between the relay substrate 1000 and a ground potential conductor (that is, the case 114*a*) in the vicinity of the modulator-side edge 212 changes compared to other portions (that is, since the relay substrate 1000 is not in electrical contact with the case 114*a* in the range of the predetermined distance d81 from the modulator-side edge 212), it is possible to substantially suppress the resonance transition by generating the radiation of the high frequency from the conductor pattern 202*a* or the like in the vicinity of the modulator-side edge 212.

[Ninth Modification Example]

Next, a ninth modification example of the optical modulator 100 according to the first embodiment will be described.

Figure 11A:
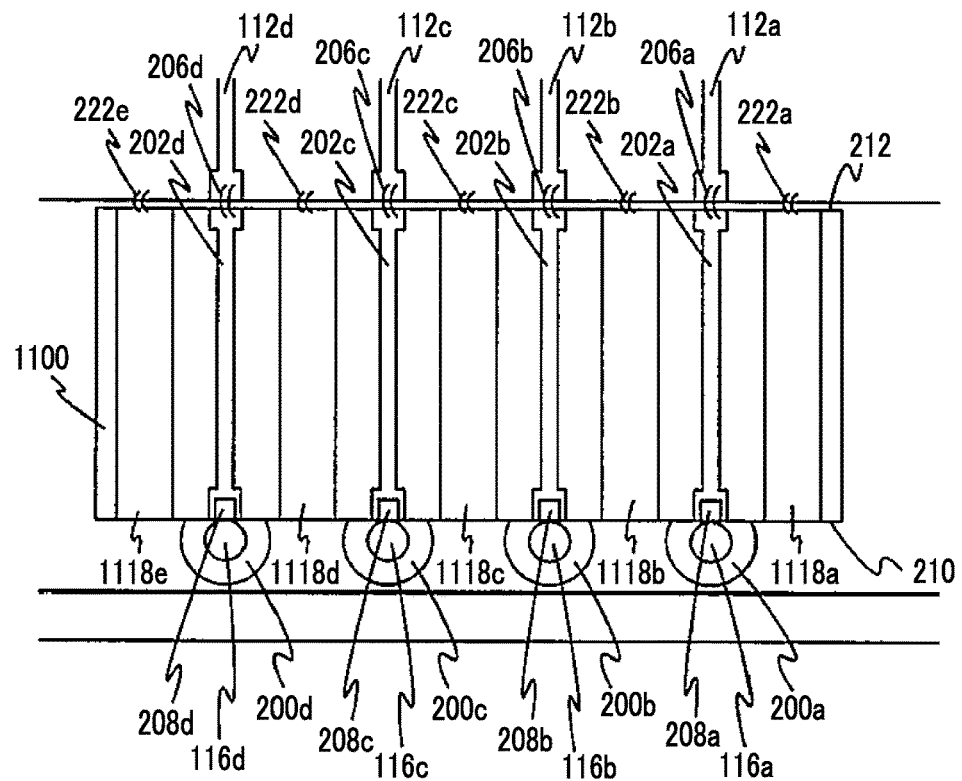
FIG. 11A is a partial detail view corresponding to FIG. 2A, showing a configuration of the periphery of a relay substrate according to a ninth modification example of the optical modulator according to the first embodiment.
Figure 11B:
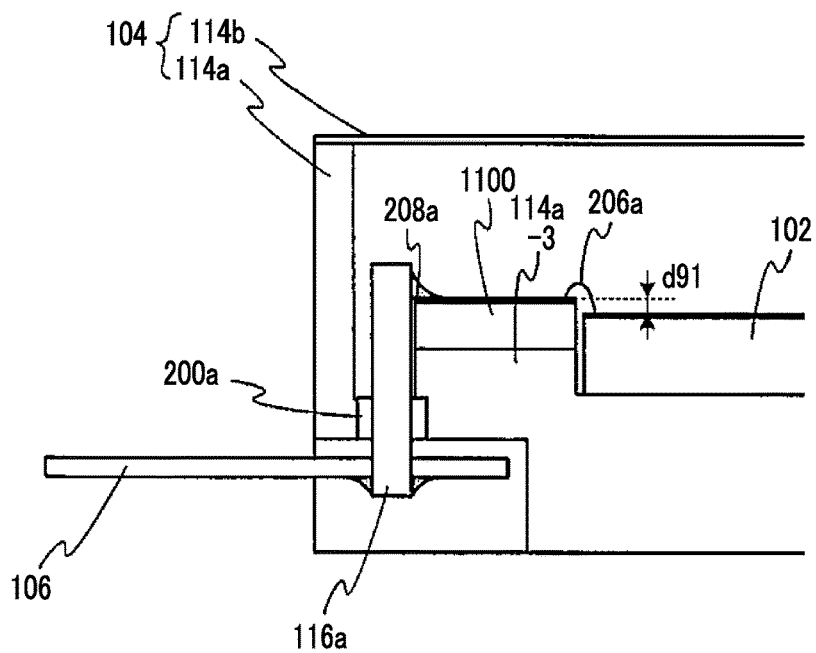
FIG. 11B is a partial detail view corresponding to FIG. 2B, showing a configuration of a cross section of the periphery of the relay substrate according to the ninth modification example of the optical modulator according to the first embodiment.

FIG. 11A and FIG. 11B are diagrams showing the configuration of a relay substrate 1100 according to this modification example, which can be used instead of the relay substrate 118, by partial detail views corresponding to FIG. 2A and FIG. 2B, respectively. In FIG. 11A and FIG. 11B, the same constituent elements as those of the relay substrate 118 shown in FIG. 2A and FIG. 2B are denoted by the same reference numerals as the reference numerals in FIG. 2A and FIG. 2B, and the description of FIG. 2A and FIG. 2B described above is cited.

The relay substrate 1100 shown in FIG. 11A and FIG. 11B is provided with the conductor patterns 202*a*, 202*b*, 202*c*, and 202*d* configured so as to function as the grounded coplanar lines, similar to the relay substrate 118. However, the relay substrate 1100 is different from the relay substrate 118 in that the relay substrate 1100 has ground patterns 1118*a*, 1118*b*, 1118*c*, 1118*d*, and 1118*e* instead of the ground patterns 218*a*, 218*b*, 218*c*, 218*d*, and 218*e*. The ground patterns 1118*a*, 1118*b*, 1118*c*, 1118*d*, and 1118*e* has the same configuration as the ground patterns 218*a*, 218*b*, 218*c*, 218*d*, and 218*e*. However, the ground patterns 1118*a*, 1118*b*, 1118*c*, 1118*d*, and 1118*e* are different from the ground patterns 218*a*, 218*b*, 218*c*, 218*d*, and 218*e* in that the ground patterns 1118*a*, 1118*b*, 1118*c*, 1118*d*, and 1118*e* may be provided with via holes having the same diameter and disposed to be distributed to the vicinity of the modulator-side edge 212, similar to the related art.

In particular, the relay substrate 1100 is configured such that the height thereof along an up-down direction in FIG. 11B is thicker than that of the relay substrate 118 and the position (that is, the height) of the front surface of the relay substrate 1100 along the up-down direction is higher than the height of the front surface of the optical modulation element 102 by a predetermined height distance d91 in the up-down direction, as shown in FIG. 11B, when the back surface of the relay substrate 1100 is fixed and is electrically connected to the case 114*a* by a conductive adhesive, a brazing material, or the like.

For this reason, in the relay substrate 1100, a step having the predetermined height distance d91 exists between the front surface of the relay substrate 1100 and the front surface of the optical modulation element 102, and thus the length of the conductor wire 206*a* or the like connecting the conductor pattern 202*a* or the like and the RF electrode 112*a* or the like to each other becomes longer, and the physical continuity from the conductor pattern 202*a* or the like to the corresponding RF electrode 112*a* or the like is disturbed (for example, an end portion of the corresponding RF electrode 112*a* does not exist near to an end portion of the conductor pattern 202*a*).

In this way, in the relay substrate 1100, the high-frequency signal is easily radiated from the conductor pattern 202*a* or the like in the vicinity of the modulator-side edge 212, and therefore, the amount of reflection of the high-frequency signals which are reflected at the connection portions between the conductor patterns 202*a*, 202*b*, 202*c*, and 202*d* and the RF electrodes 112*a*, 112*b*, 112*c*, and 112*d*, among the high-frequency signals propagating through the conductor patterns 202*a*, 202*b*, 202*c*, and 202*d*, is reduced accordingly (that is, the amount of radiation of the high frequency in the portion (the vicinity of a connection portion) (for example, within a predetermined range including the connection portion, or within a range of the connection portion and a predetermined distance from the connection portion) in the vicinity of the modulator-side edge 212 which includes a connection portion between the conductor pattern 202*a* or the like and the RF electrode 112*a* or the like or a portion in the vicinity of the connection portion is increased compared to the other portion), and thus the resonance transition between the conductor patterns 202*a*, 202*b*, 202*c*, and 202*d* is suppressed.

In this modification example, the thickness of the relay substrate 1100 is made to be thicker than that of the relay substrate 118, so that the front surface of the relay substrate 1100 becomes higher than the front surface of the optical modulation element 102. However, there is not limitation thereto, and a configuration may be made such that the front surface of the relay substrate 1100 becomes higher than the front surface of the optical modulation element 102, for example, by making the thickness of the relay substrate 1100 the same as the thickness of the relay substrate 118 and increasing the height along the up-down direction of the pedestal part 114*a*-3 on which the relay substrate 1100 is mounted, of the case 114*a*, or reducing the thickness of the optical modulation element 102.

Further, in this modification example, a configuration is made such that the front surface of the relay substrate 1100 is higher than the front surface of the optical modulation element 102. However, there is no limitation thereto, and a configuration may be made such that the front surface of the relay substrate 1100 is lower than the front surface of the optical modulation element 102, thereby disturbing the physical continuity from the conductor pattern 202*a* or the like to the RF electrode 112*a* or the like. However, in the configuration made such that the front surface of the relay substrate 1100 is higher than the front surface of the optical modulation element 102, as in this modification example, the amount of high frequencies which are radiated from the conductor pattern 202*a* or the like and then hit against and are reflected by the optical modulation element 102 is further suppressed, and therefore, it is possible to obtain the better effect of suppressing the resonance transition.

Further, the configuration of this modification example in which the resonance transition is suppressed by making the height of the front surface of the relay substrate and the height of the front surface of the optical modulation element different from each other can exert the effect of suppressing the resonance transition, even in a case of using a relay substrate in which a conductor pattern is not formed as a grounded coplanar line (for example, a relay substrate in which a conductor pattern is formed as a normal coplanar line (not the grounded coplanar line)).

<Second Embodiment>

Next, a second embodiment of the present invention will be described. This embodiment is an optical transmission apparatus equipped with the optical modulator according to any one of the first embodiment and the first to ninth modification examples described above.

Figure 12:
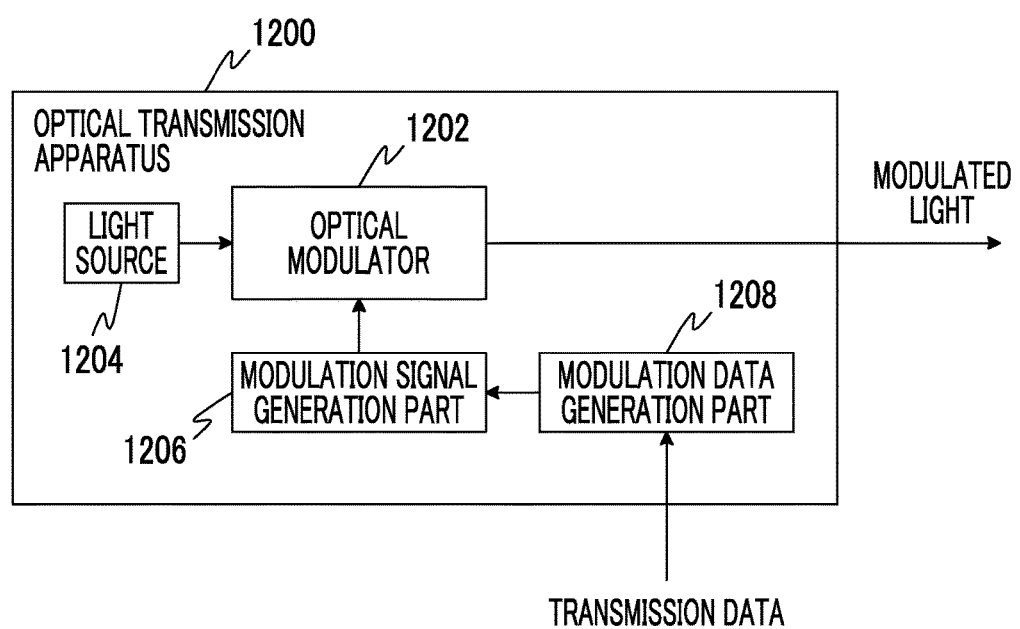
FIG. 12 is a diagram showing a configuration of an optical transmission apparatus according to a second embodiment of the present invention.
Figure 13A:
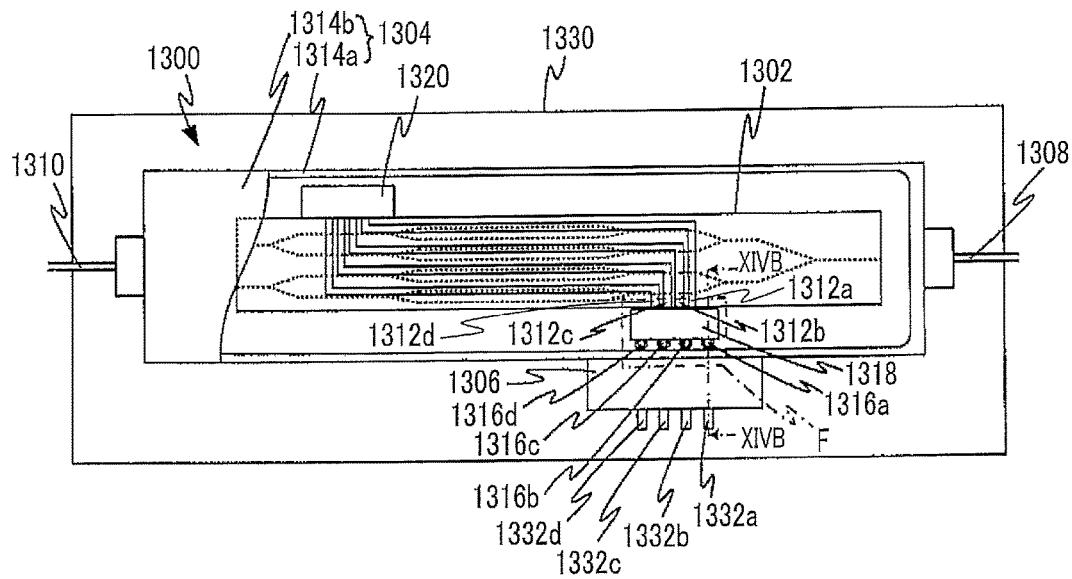
FIG. 13A is a plan view of an optical modulator of the related art, showing a configuration of the optical modulator.
Figure 13B:
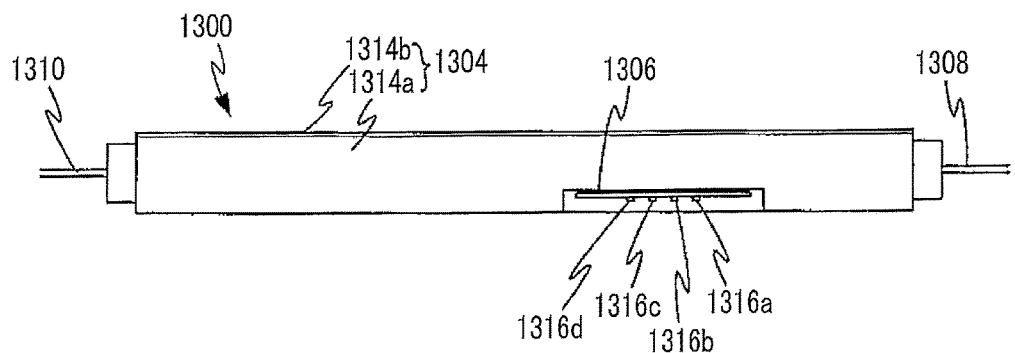
FIG. 13B is a side view of the optical modulator of the related art.
Figure 13C:
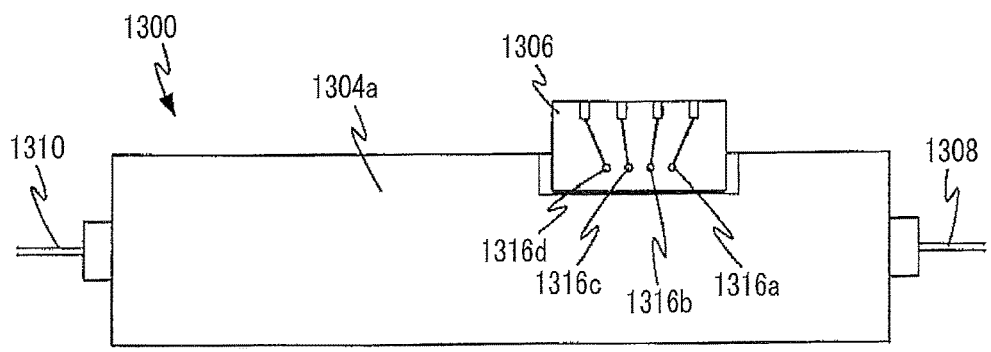
FIG. 13C is a bottom view of the optical modulator of the related art.
Figure 14A:
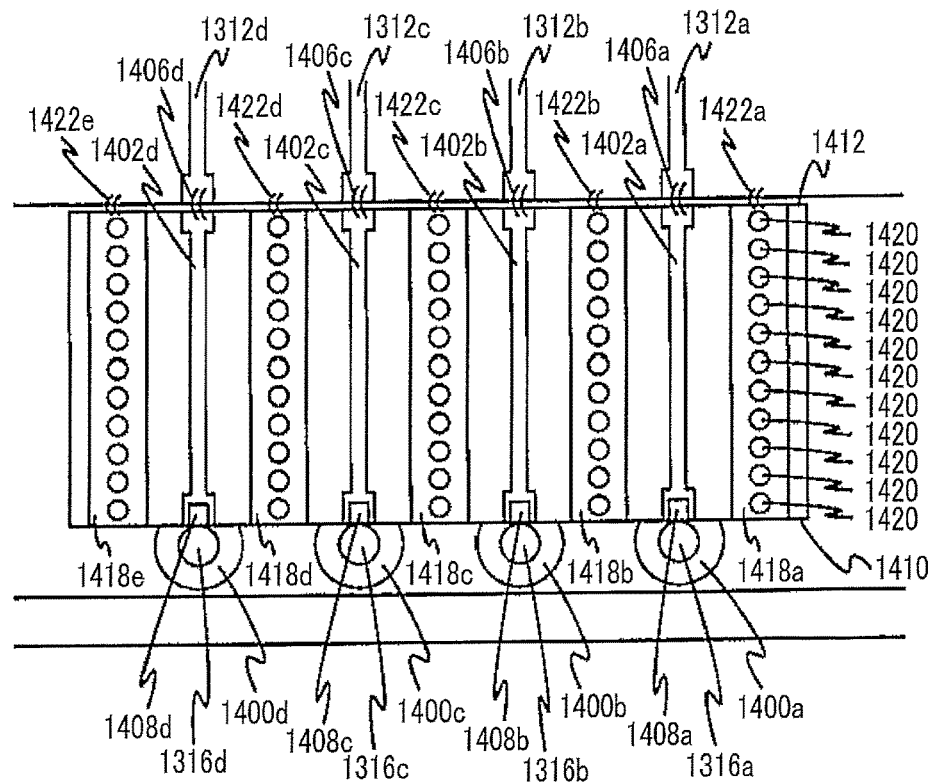
FIG. 14A is a partial detail view of a portion F of the optical modulator shown in FIG. 13A.
Figure 14B:
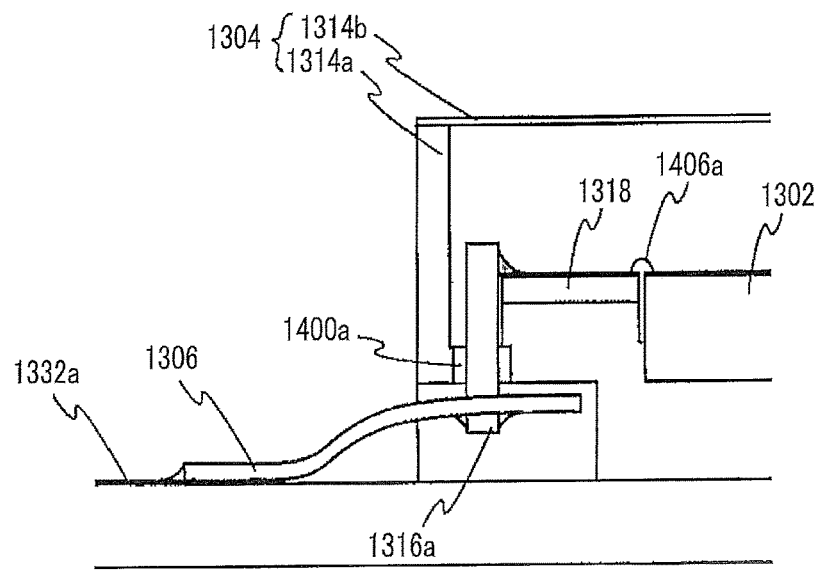
FIG. 14B is a cross-sectional view of the optical modulator taken along line XIVB-XIVB in FIG. 13A and viewed in a direction of an arrow.

FIG. 12 is a diagram showing the configuration of the optical transmission apparatus according to this embodiment. An optical transmission apparatus 1200 has an optical modulator 1202, a light source 1204 to input light to the optical modulator 1202, a modulation signal generation part 1206, and a modulation data generation part 1208.

The optical modulator 1202 can be set to be the optical modulator according to any one of the first embodiment described above and the first to ninth modification examples described above. However, in the following description, in order to avoid overlapping description and facilitate understanding, it is assumed that the optical modulator 100 according to the first embodiment is used as the optical modulator 1202.

The modulation data generation part 1208 receives transmission data which is provided from the outside, generates modulation data (for example, data obtained by converting or processing the transmission data to a predetermined data format) for transmitting the transmission data, and outputs the generated modulation data to the modulation signal generation part 1206.

The modulation signal generation part 1206 is an electronic circuit (a drive circuit) which outputs an electrical signal for causing the optical modulator 1202 to perform a modulation operation, generates a modulation signal that is a high-frequency signal for causing the optical modulator 1202 to perform an optical modulation operation according to the modulation data, based on the modulation data output from the modulation data generation part 1208, and inputs the modulation signal to the optical modulator 1202. The modulation signal is composed of four RF signals corresponding to the four RF electrodes 112*a*, 112*b*, 112*c*, and 112*d* of the optical modulation element 102 provided in the optical modulator 100 that is the optical modulator 1202.

The four RF signals are input to the lead pins 116*a*, 116*b*, 116*c*, and 116*d* via the FPC 106 of the optical modulator 100 that is the optical modulator 1202, and are respectively applied to the RF electrodes 112*a*, 112*b*, 112*c*, and 112*d* via the relay substrate 118.

In this way, the light output from the light source 1204 is modulated by the optical modulator 1202 and becomes modulated light, which is then output from the optical transmission apparatus 1200.

In particular, in the optical transmission apparatus 1200, the optical modulator according to any one of the first embodiment or the first to ninth modification examples described above is used as the optical modulator 1202, and therefore, a stable and good optical modulation characteristic can be secured. Therefore, stable and good transmission characteristics can be realized.

In each of the embodiments described above, the optical modulator which is provided with the optical modulation element using LN as the substrate and having four RF electrodes is shown. However, the present invention is not limited thereto and can also be likewise applied to an optical modulator having a plurality (a number other than four) of RF electrodes, and/or an optical modulator in which materials other than LN are used for the substrate.

As described above, in the optical modulators according to the embodiments described above and the modification examples thereof, the amount of reflection (therefore, reflectance) of the high frequency in a portion in the vicinity of the modulator-side edge 212 is reduced by causing the high-frequency signal to be radiated in the portion in the vicinity of the modulator-side edge 212, for example, by weakening the high-frequency confinement effect of the conductor pattern 202a or the like in the portion in the vicinity of the modulator-side edge 212. As a result, it is possible to suppress the resonance transition between the conductor patterns and prevent deterioration of the optical modulation characteristic in the optical modulation element.

The configurations of the first embodiment described above and the modification examples thereof can be used in combination with each other within a range in which the configurations are not mutually exclusive and can be combined without contradiction in structure in one relay substrate. For example, it is possible to configure one relay substrate by combining the configurations of the via holes of the relay substrate 118 in the first embodiment and the configuration of the relay substrate 700 in the fifth modification example having two portions with different thicknesses.

What is claimed is:

1. An optical modulator comprising:
an optical modulation element including a plurality of signal electrodes;
a plurality of lead pins for inputting a high-frequency signal;
a relay substrate in which conductor patterns that electrically connect the lead pins and the signal electrodes are formed; and
a ground pattern provided on a front surface of the relay substrate,
wherein the ground pattern provided on the front surface of the relay substrate is connected to a ground pattern provided on a back surface of the relay substrate through a plurality of via holes,
the ground pattern on the front surface has a part which extends with a constant width from an edge of the relay substrate closest to a connection portion between the conductor pattern and the signal electrode, and
a diameter of each of the via holes which is provided in the part and within a predetermined distance range from an edge of the relay substrate closest to the connection portion, is smaller than a diameter of each of the via holes which is provided in the part and outside the predetermined distance range.

2. An optical transmission apparatus comprising:
the optical modulator according to claim 1; and
an electronic circuit which outputs an electric signal for causing the optical modulator to perform a modulation operation.

3. An optical modulator comprising:
an optical modulation element including a plurality of signal electrodes;
a plurality of lead pins for inputting a high-frequency signal;
a relay substrate in which conductor patterns that electrically connect the lead pins and the signal electrodes are formed; and
a ground pattern provided on a front surface of the relay substrate,
wherein the ground pattern provided on the front surface of the relay substrate is connected to a ground pattern provided on a back surface of the relay substrate through a plurality of via holes,
the via hole is not provided within a range of a distance $d_{11}$ from an edge of the relay substrate closest to a connection portion between the conductor pattern and the signal electrode, and
the distance $d_{11}$ is twice or more than a distance $d_{12}$ from the ground pattern on the front surface to the conductor pattern adjacent to said ground pattern on the front surface.

4. An optical transmission apparatus comprising:
the optical modulator according to claim 3; and
an electronic circuit which outputs an electric signal for causing the optical modulator to perform a modulation operation.

5. An optical modulator comprising:
an optical modulation element including a plurality of signal electrodes;
a plurality of lead pins for inputting a high-frequency signal;
a relay substrate in which conductor patterns that electrically connect the lead pins and the signal electrodes are formed; and
a ground pattern which is provided on a front surface of the relay substrate,
wherein the ground pattern provided on a front surface of the relay substrate has a portion with a width $d_{22}$ which extends along a length direction of the conductor pattern adjacent to said ground pattern, within a range of a distance $d_{21}$ from an edge of the relay substrate closest to a connection portion between the conductor pattern and the signal electrode,
the distance $d_{21}$ is twice or more than a width $d_{23}$ of the adjacent conductor pattern, and
the width $d_{22}$ is equal to or less than ten times the width $d_{23}$.

6. An optical transmission apparatus comprising:
the optical modulator according to claim 5; and
an electronic circuit which outputs an electric signal for causing the optical modulator to perform a modulation operation.

7. An optical modulator comprising:
an optical modulation element including a plurality of signal electrodes;
a plurality of lead pins for inputting a high-frequency signal;
a relay substrate in which conductor patterns that electrically connect the lead pins and the signal electrodes are formed; and
a ground pattern which is provided on a front surface of the relay substrate,
wherein the front surface has an area which includes an edge of the relay substrate closest to a connection portion between the conductor pattern and the signal electrode and into which the conductor pattern extends but the ground pattern on the front surface does not extend.

8. The optical modulator according to claim 7, wherein a wire at a position closest to the adjacent conductor pattern thereto, among wires which connect the ground pattern provided on the front surface of the relay substrate and a ground electrode provided on the optical modulation element, is connected to said ground pattern at a position away by a distance (d42, d43) from an edge on the side of the adjacent conductor pattern among edges of said ground pattern, and the distance (d42, d43) is equal to or longer than a distance (d44, d45) between the edge on the side of the adjacent conductor pattern and an edge of said conductor pattern.

9. An optical transmission apparatus comprising:
the optical modulator according to claim 7; and
an electronic circuit which outputs an electric signal for causing the optical modulator to perform a modulation operation.

10. An optical modulator comprising:
an optical modulation element including a plurality of signal electrodes;
a plurality of lead pins for inputting a high-frequency signal;
a relay substrate in which conductor patterns that electrically connect the lead pins and the signal electrodes are formed; and
a ground pattern which is provided on a front surface of the relay substrate,
wherein the conductor pattern forms a coplanar line together with the ground pattern on the front surface and a structure connected to a ground potential which comes into contact with a back surface of the relay substrate,
the back surface has an area which includes an edge of the relay substrate closest to a connection portion between the conductor pattern and the signal electrode and which is not electrically connected to the structure through a conductive material, and
the back surface is electrically connected, in a portion outside the area, to the structure through a conductive material.

11. The optical modulator according to claim 10, wherein the relay substrate is configured such that a thickness of the area is thinner than a thickness of the portion outside the area.

12. The optical modulator according to claim 10, wherein a metal film is provided at the portion outside the area, and the metal film is not provided in the area.

13. The optical modulator according to claim 10, wherein the relay substrate is mounted on the structure such that the area protrudes from an edge of the structure towards the optical modulation element.

14. An optical transmission apparatus comprising:
the optical modulator according to claim 10; and
an electronic circuit which outputs an electric signal for causing the optical modulator to perform a modulation operation.

15. An optical modulator comprising:
an optical modulation element which includes a plurality of signal electrodes;
a plurality of lead pins for inputting a high-frequency signal; and
a relay substrate in which conductor patterns which electrically connect the lead pins and the signal electrodes are formed on a front surface thereof,
wherein the front surface of the relay substrate and a surface of the optical modulation element on which the signal electrodes are formed form a step at a portion where the conductor pattern and the signal electrode are connected to each other, and
wherein the step is a level difference between the front surface of the relay substrate and the surface of the optical modulation element.

16. An optical transmission apparatus comprising:
the optical modulator according to claim 15; and
an electronic circuit which outputs an electric signal for causing the optical modulator to perform a modulation operation.

* * * * *